United States Patent [19]
Ono et al.

[11] Patent Number: 5,552,937
[45] Date of Patent: Sep. 3, 1996

[54] WIDE-ANGEL ASPHERIC ZOOM LENS

[75] Inventors: Shusuke Ono, Takatsuki; Hiroaki Okayama, Yamatotakada; Yasuo Nakajima, Ibaraki, all of Japan

[73] Assignee: Matsushita Electric Industrial Co., Ltd., Osaka, Japan

[21] Appl. No.: 224,567

[22] Filed: Apr. 7, 1994

[30] Foreign Application Priority Data

Apr. 13, 1993 [JP] Japan .................... 5-086151
Oct. 19, 1993 [JP] Japan .................... 5-260512

[51] Int. Cl.⁶ .................... G02B 15/14; G02B 15/177
[52] U.S. Cl. .................... 359/691; 359/680; 359/682; 359/713
[58] Field of Search .................... 359/680, 681, 359/682, 691, 708, 713, 717

[56] References Cited

U.S. PATENT DOCUMENTS

| | | | |
|---|---|---|---|
| 4,726,665 | 2/1988 | Itoh | 359/681 |
| 4,726,667 | 2/1988 | Tachihara | 359/681 |
| 5,054,897 | 10/1991 | Ozawa | 359/680 |
| 5,076,677 | 12/1991 | Sato | 359/680 |
| 5,155,629 | 10/1992 | Ito et al. | 359/676 |
| 5,175,649 | 12/1992 | Uzawa | 359/691 |

Primary Examiner—David C. Nelms
Assistant Examiner—Son Mai
Attorney, Agent, or Firm—Beveridge, DeGrandi, Weilacher & Young

[57] ABSTRACT

A first lens group having a negative refracting power and a second lens group having a positive refracting power are arranged in order from the photographing object side. Zooming is performed by changing the aerial interval between the first and second lens groups, and both the first and second lens groups have one or more aspheric surfaces. The first lens group includes two negative lenses and a positive lens which are arranged in order from the object side, and the second lens group includes a positive lens, a cemented lens having a positive lens and a negative lens, and a positive lens which are arranged in order from the object side.

16 Claims, 38 Drawing Sheets

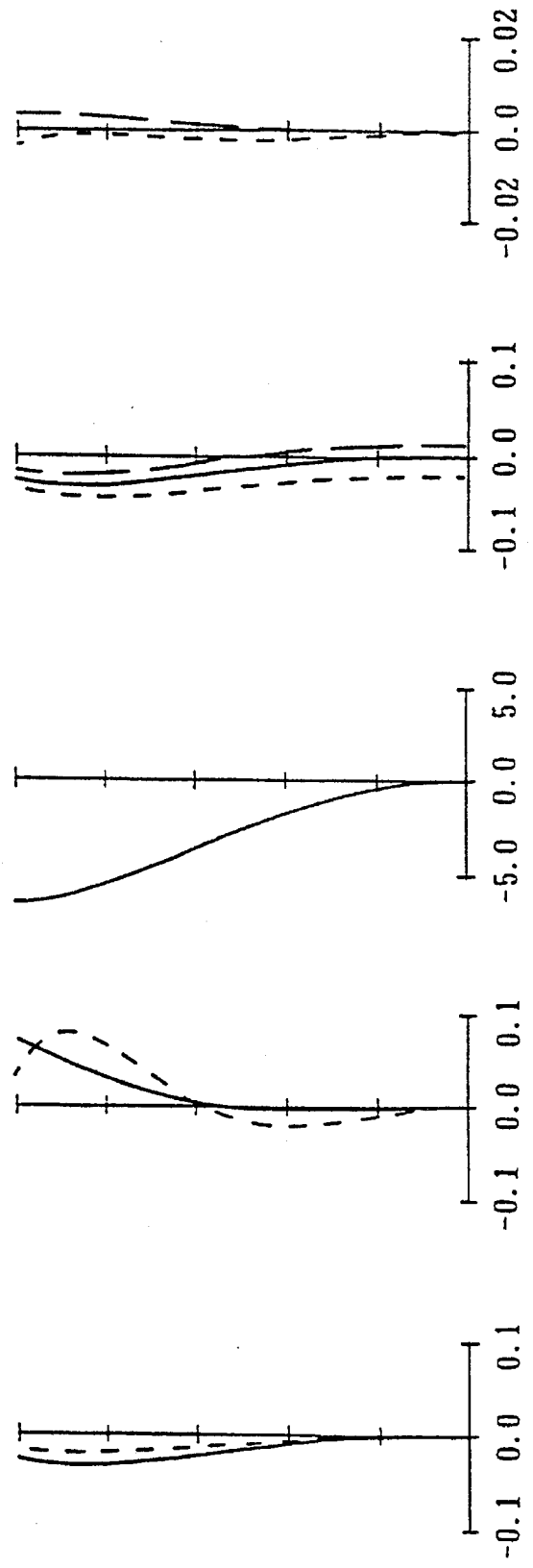

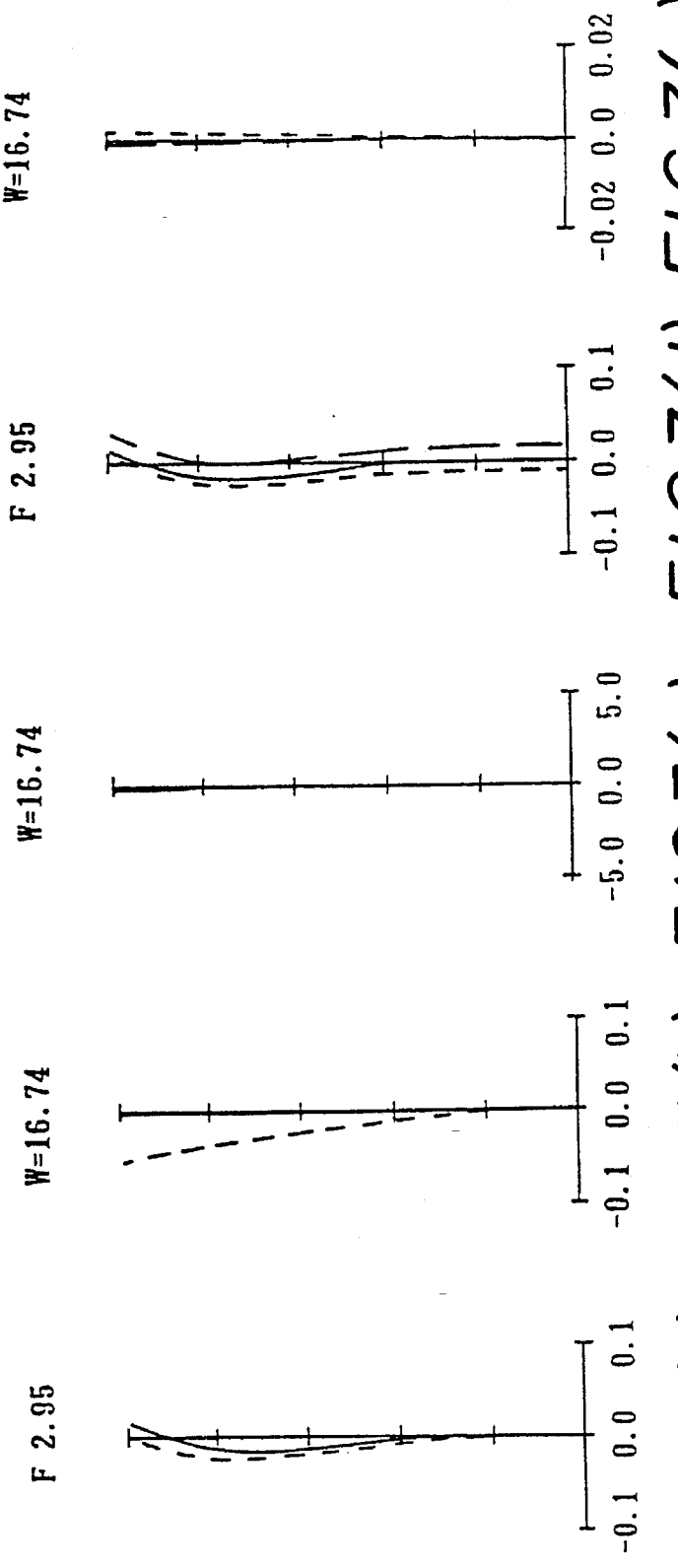

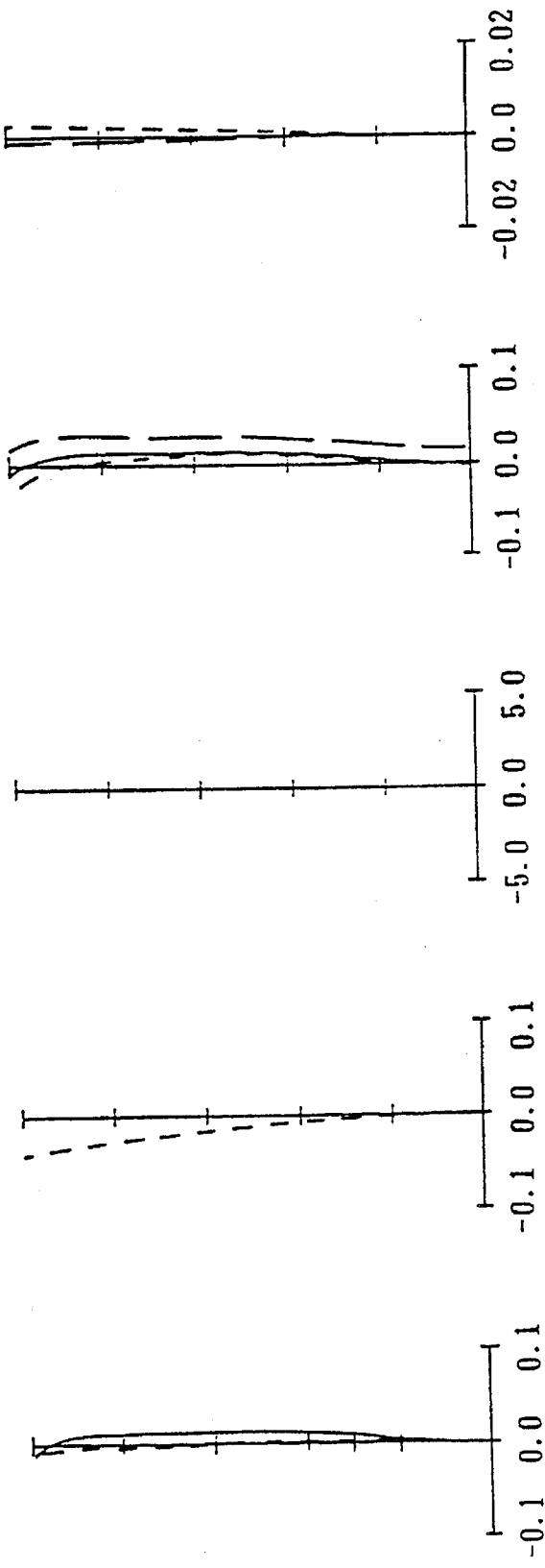

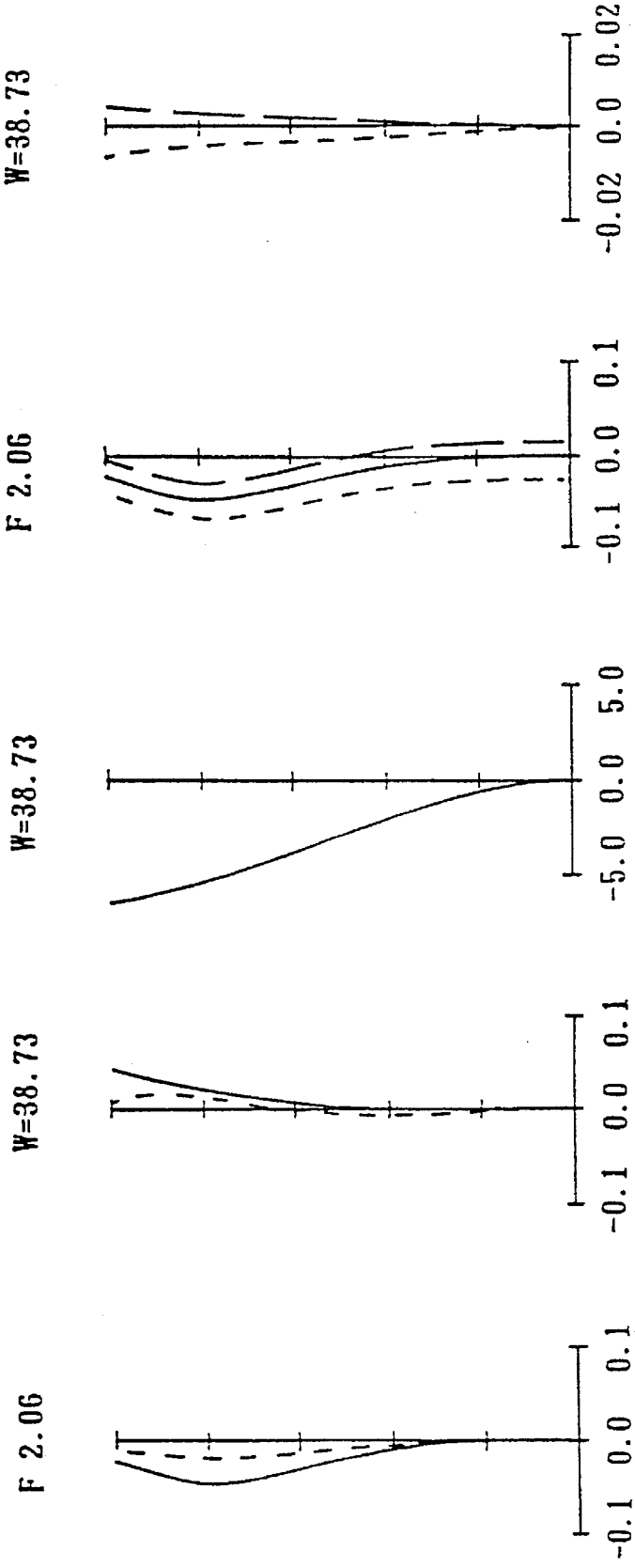

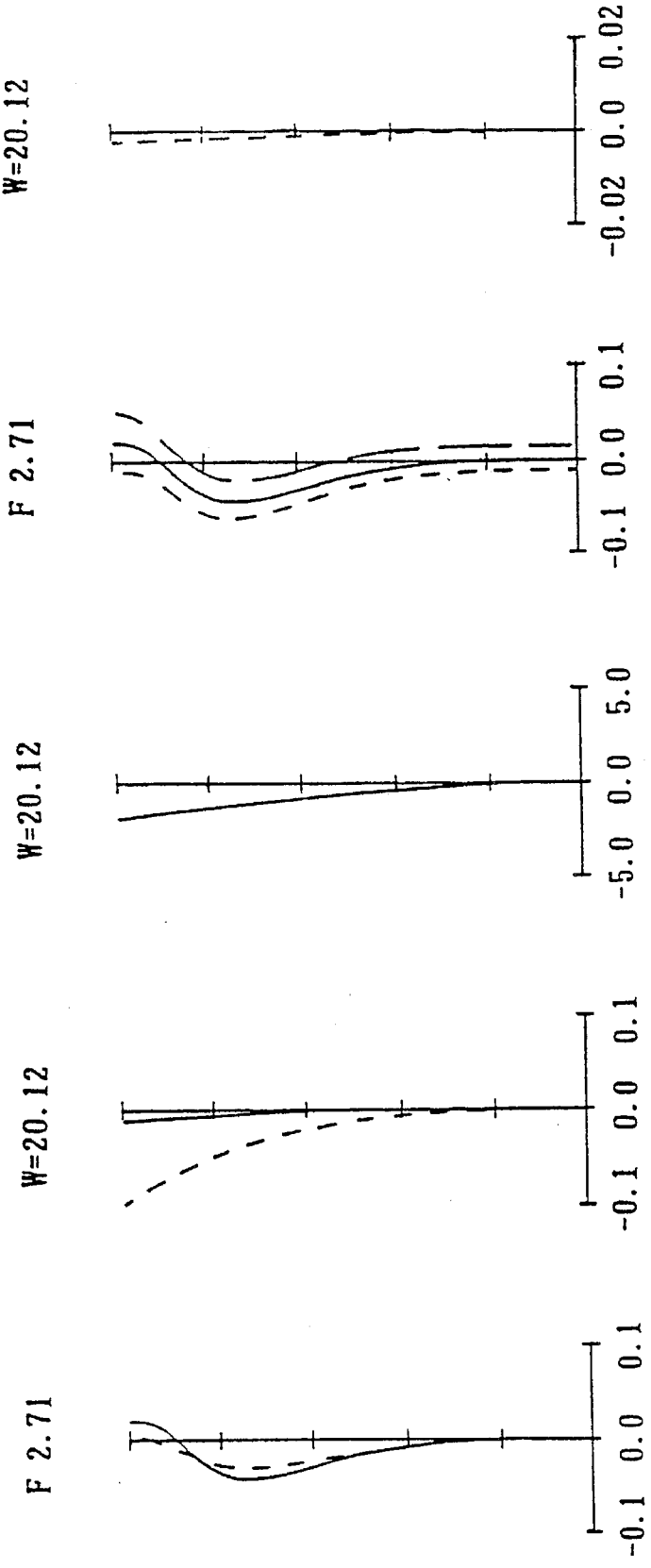

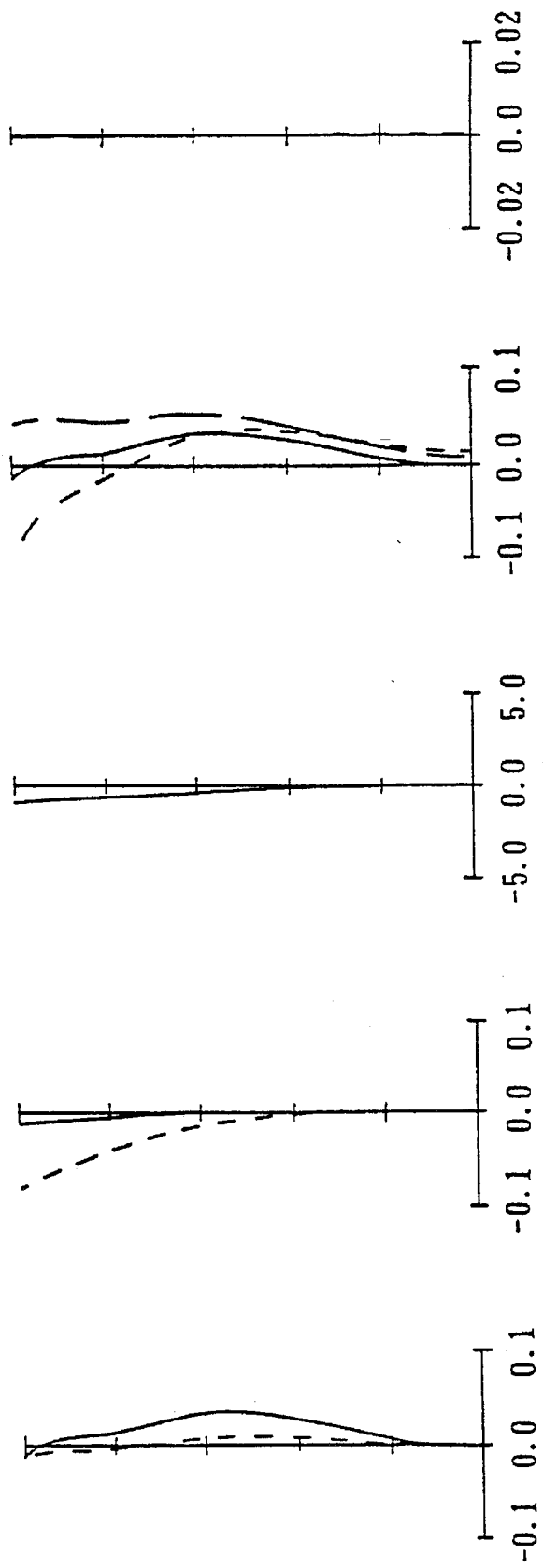

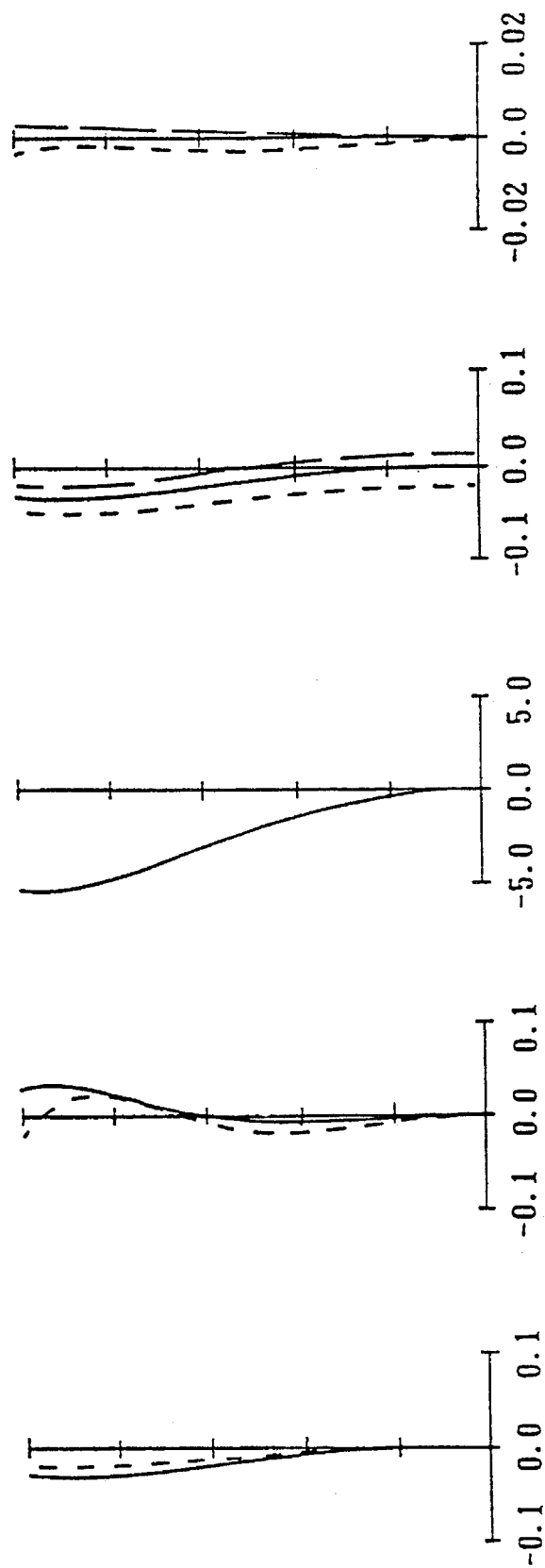

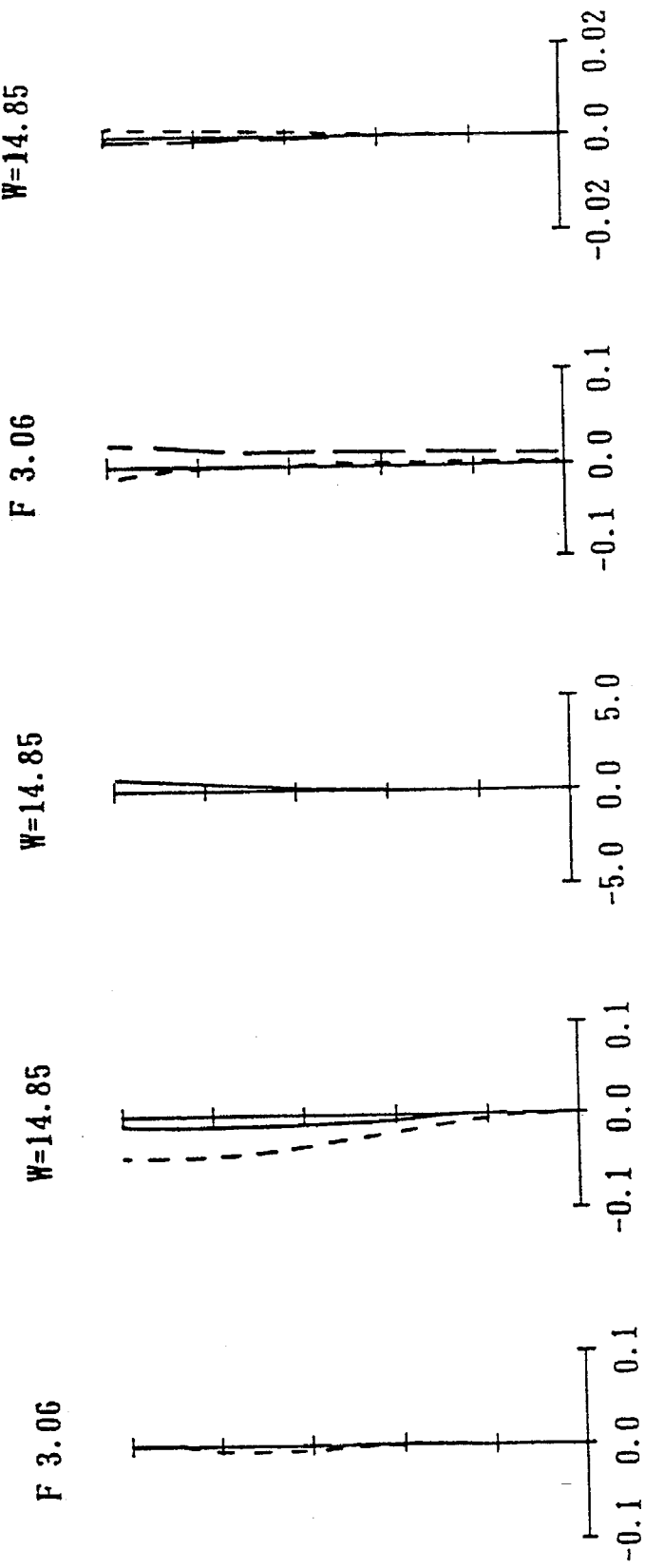

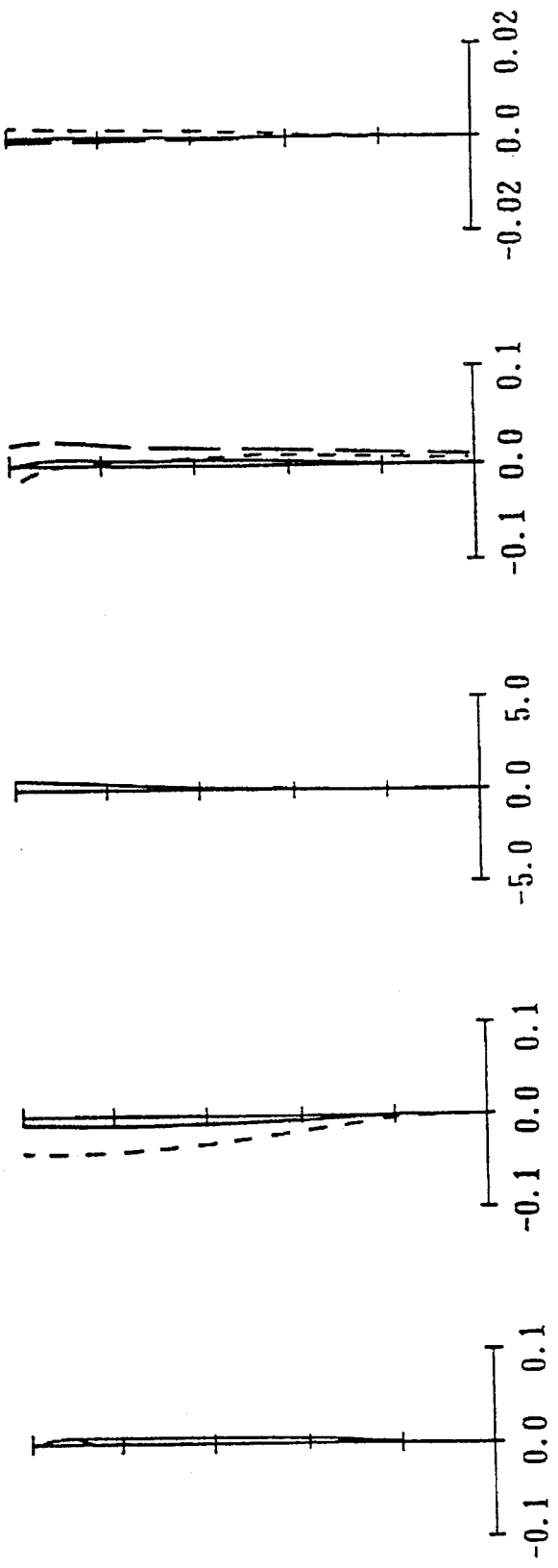
FIG. 10(a) F 3.11
FIG. 10(b) W=14.45
FIG. 10(c) W=14.45
FIG. 10(d) F 3.11
FIG. 10(e) W=14.45

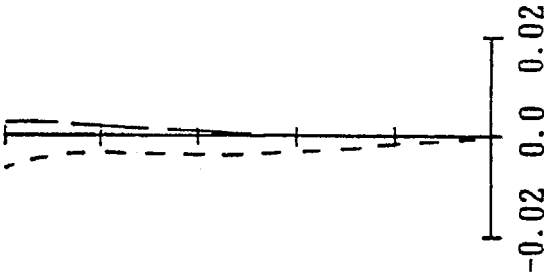
FIG.11(a) FIG.11(b) FIG.11(c)
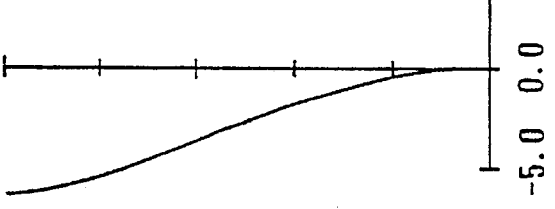
FIG.11(d) FIG.11(e)
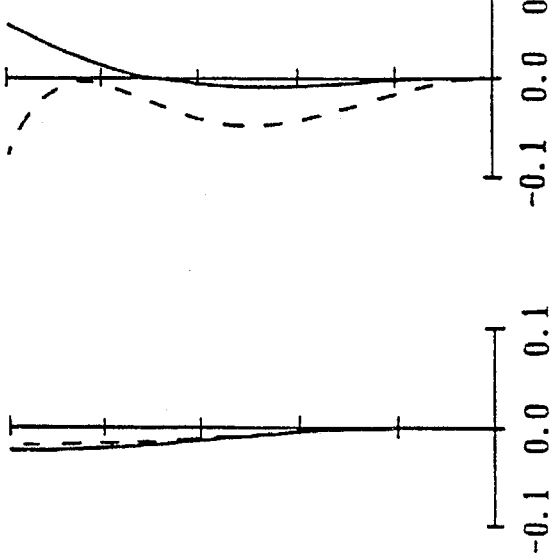

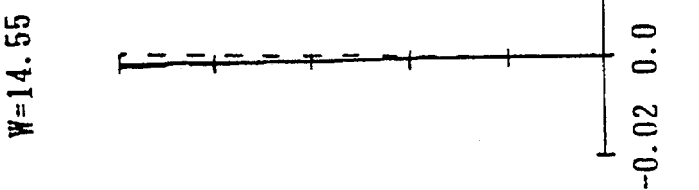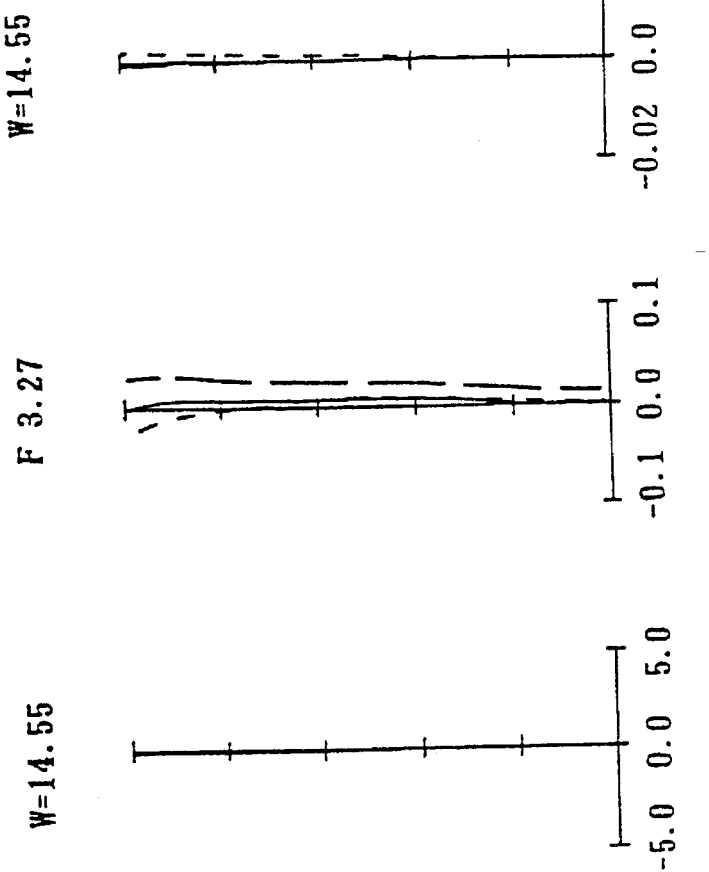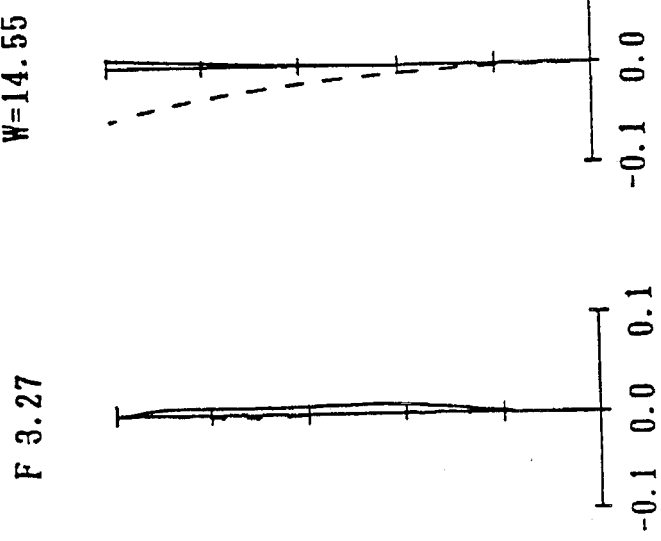

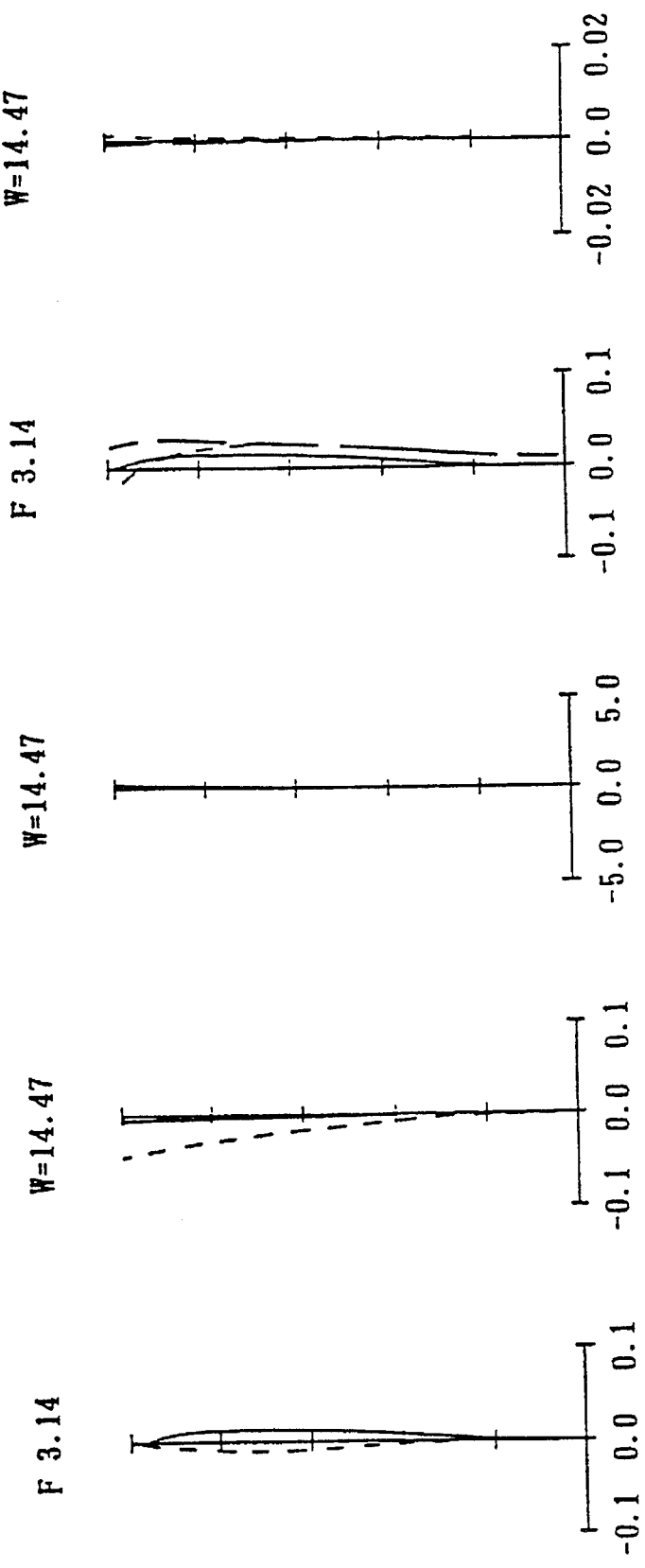

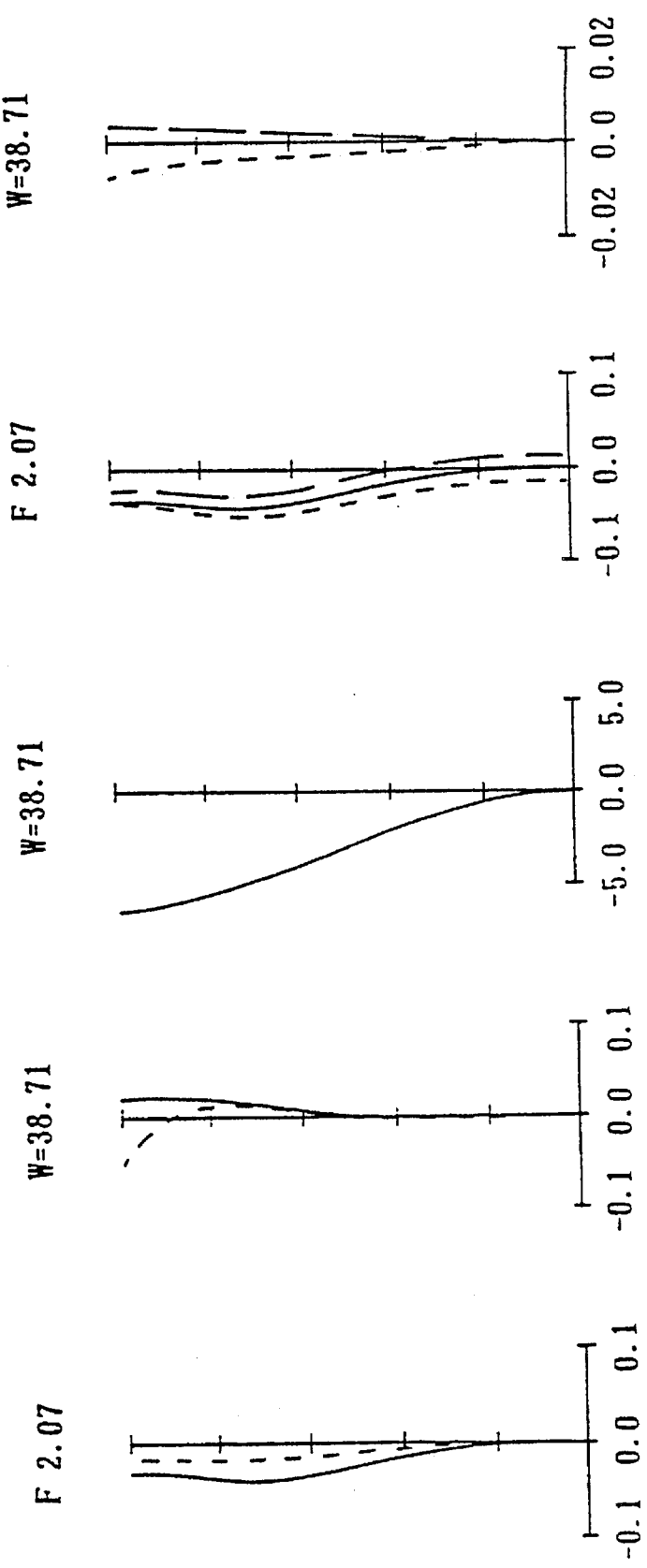

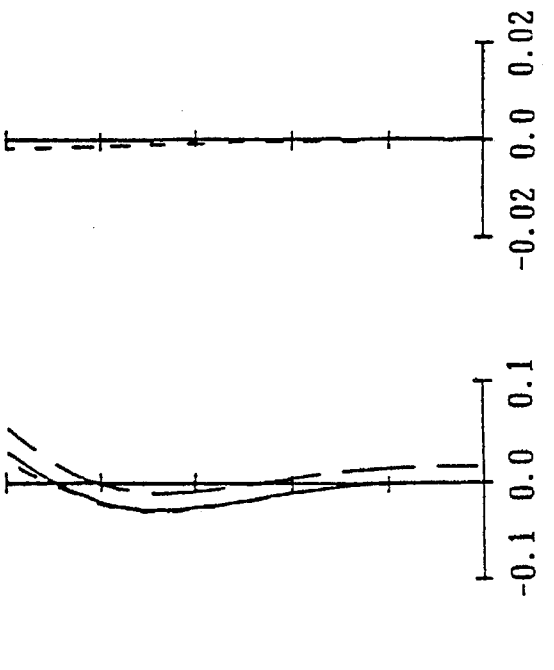
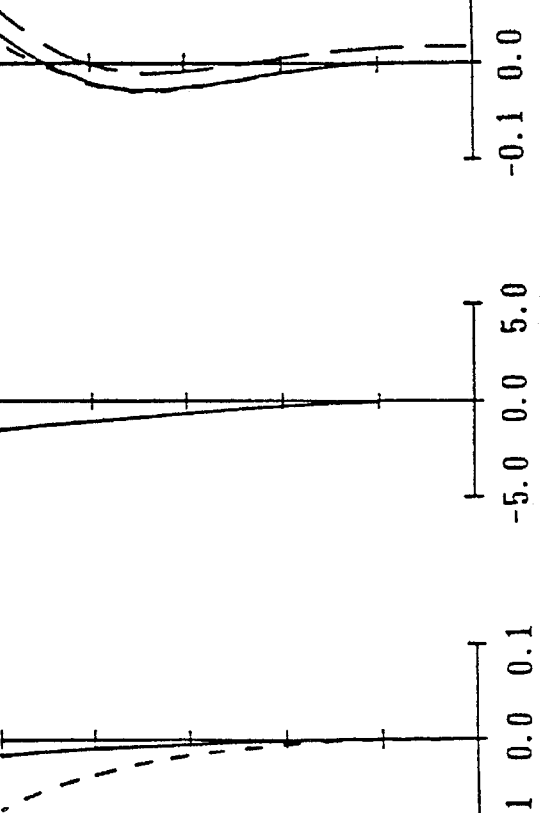
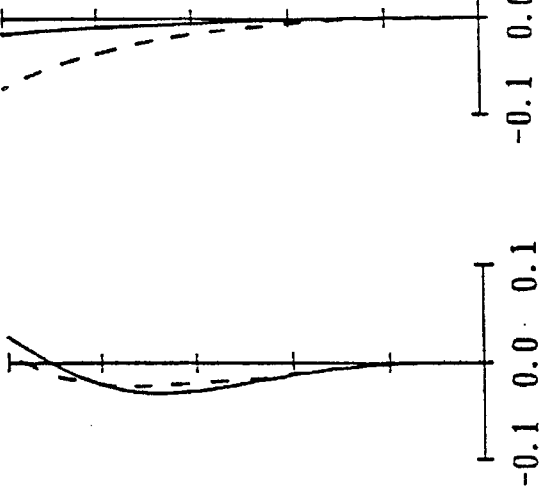

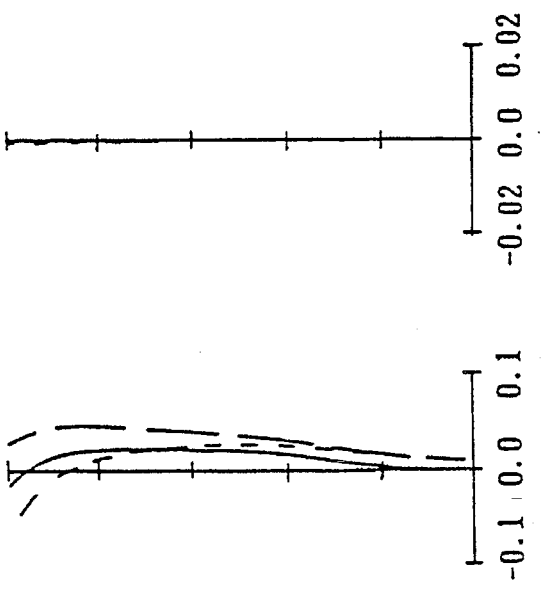
FIG.19(a) FIG.19(c) FIG.19(e)
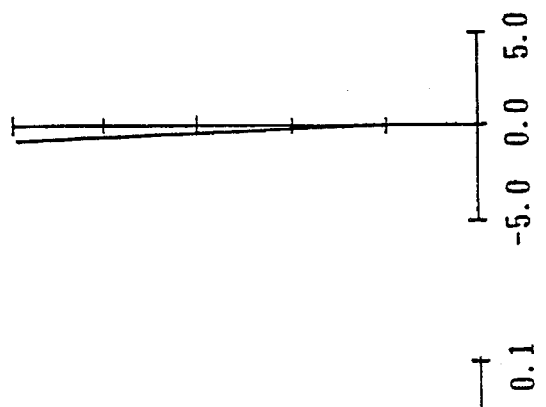
FIG.19(b) FIG.19(d)
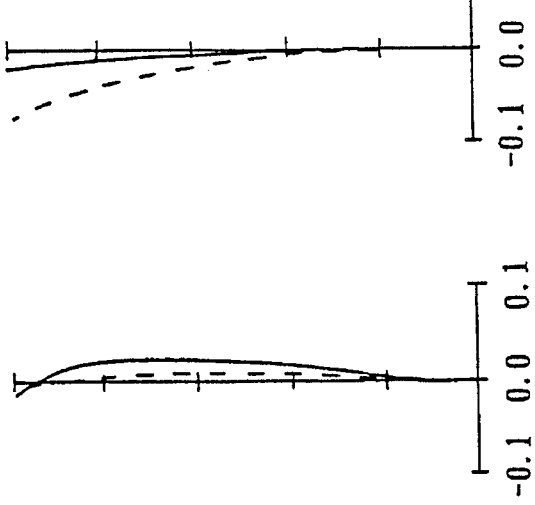

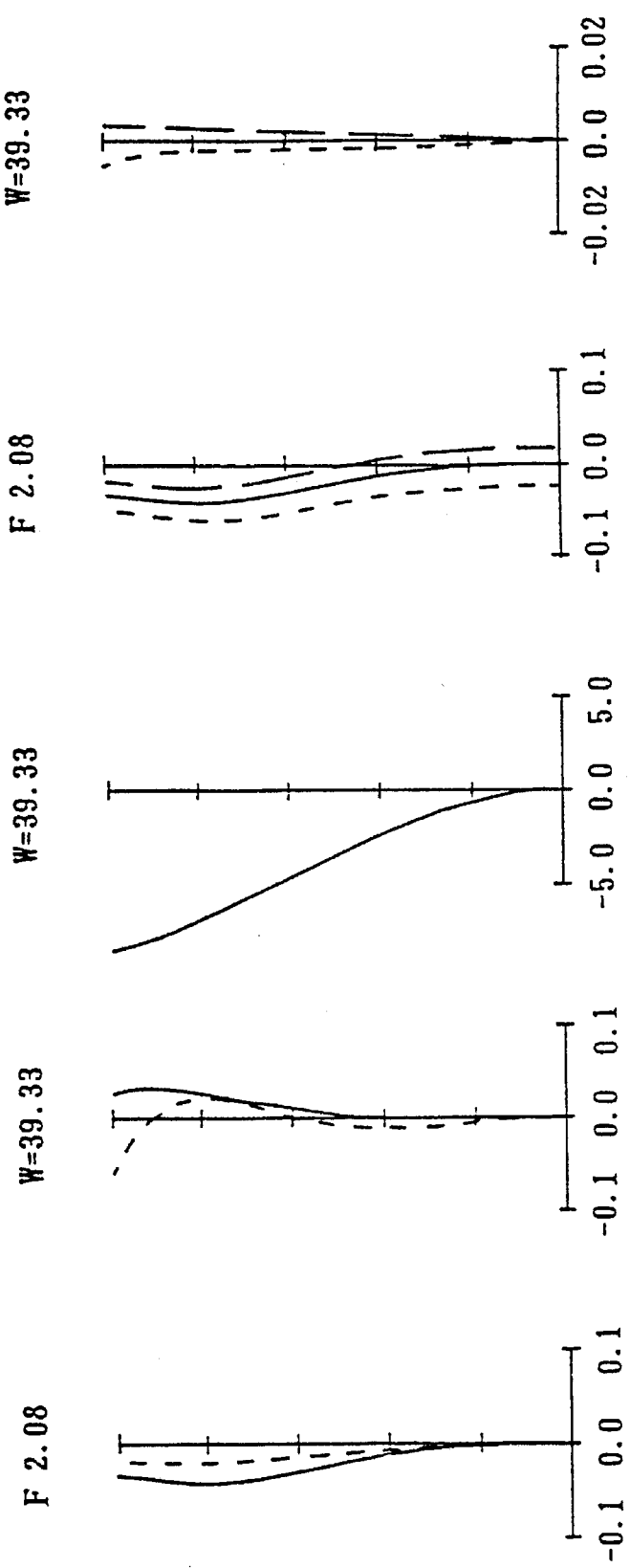

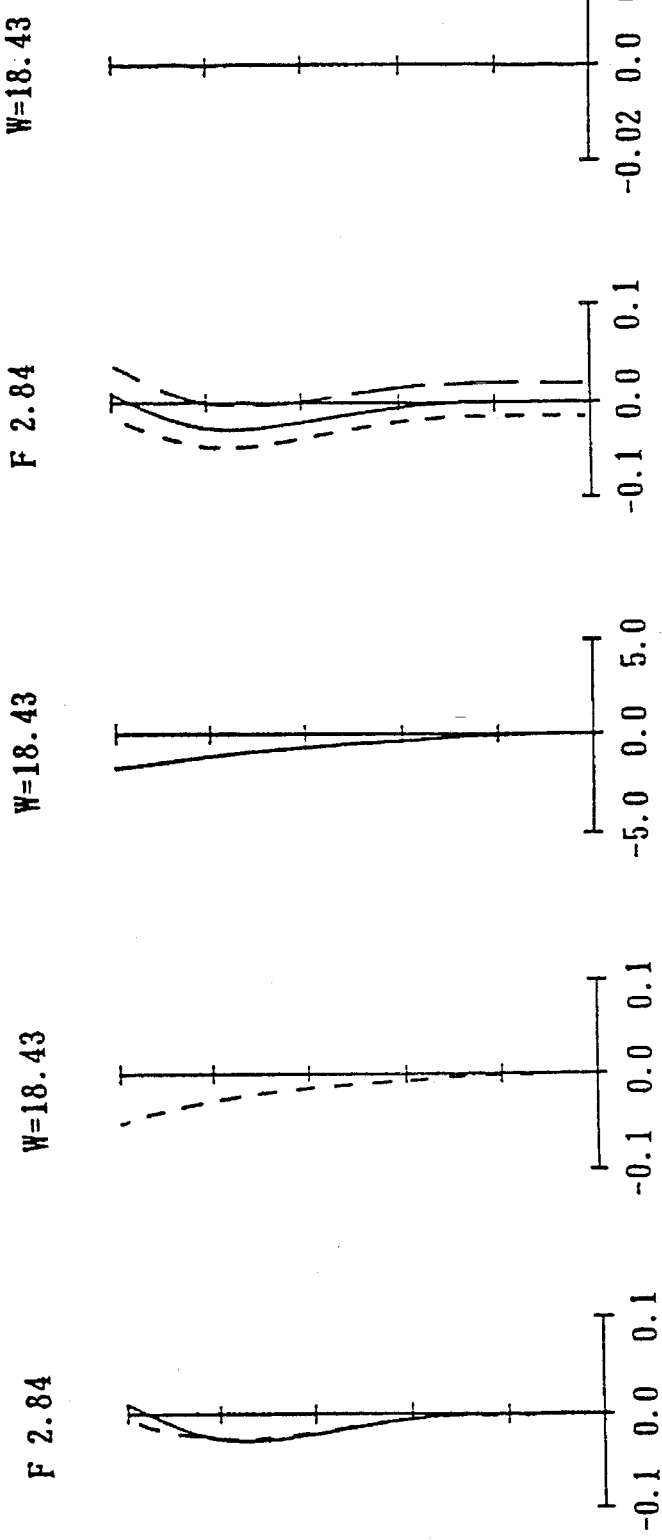
FIG. 21(a) F 2.84
FIG. 21(b) W=18.43
FIG. 21(c) W=18.43
FIG. 21(d) F 2.84
FIG. 21(e) W=18.43

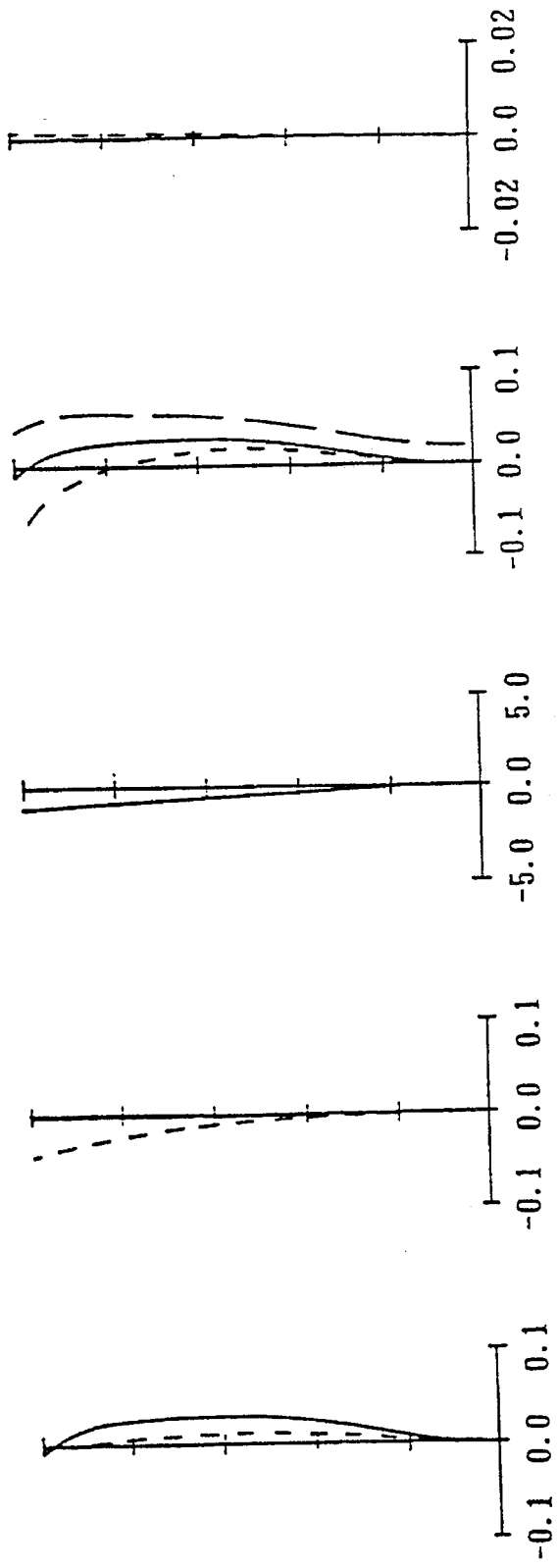

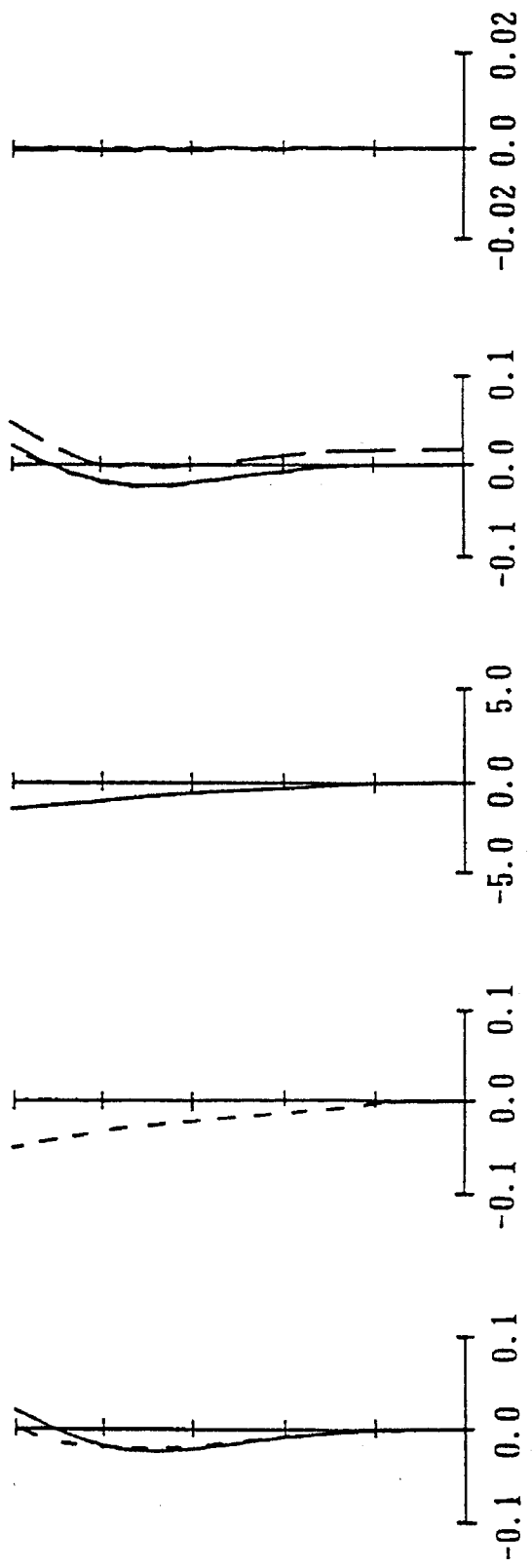

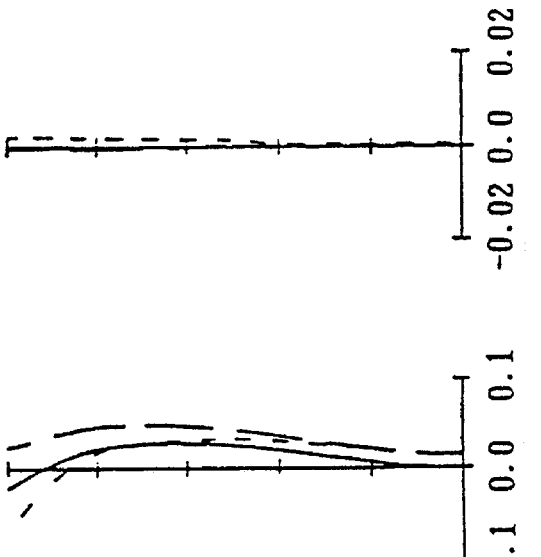
FIG.25(a) FIG.25(c) FIG.25(e)
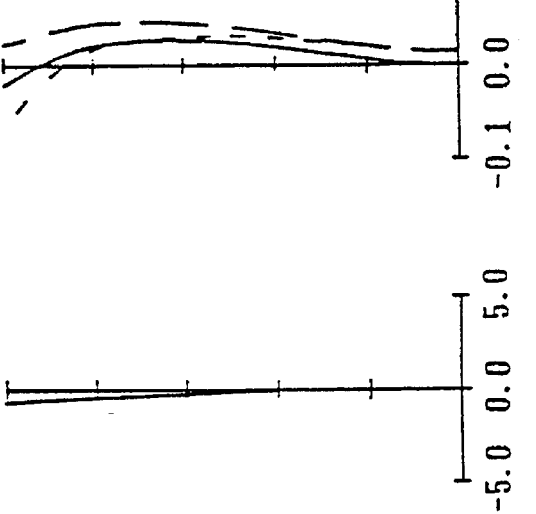
FIG.25(b) FIG.25(d)
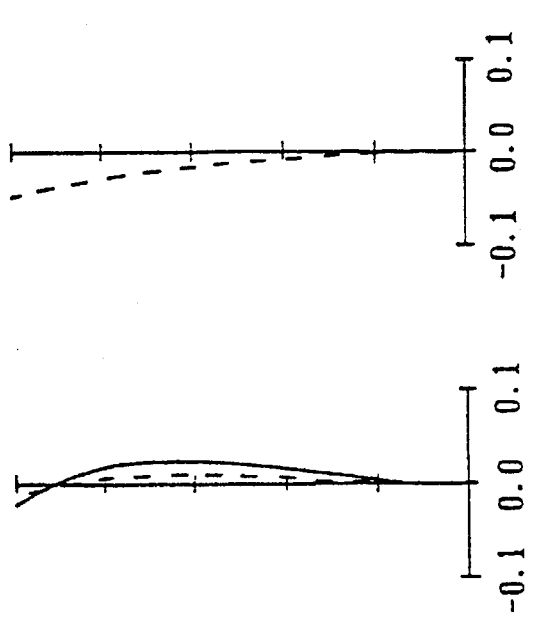

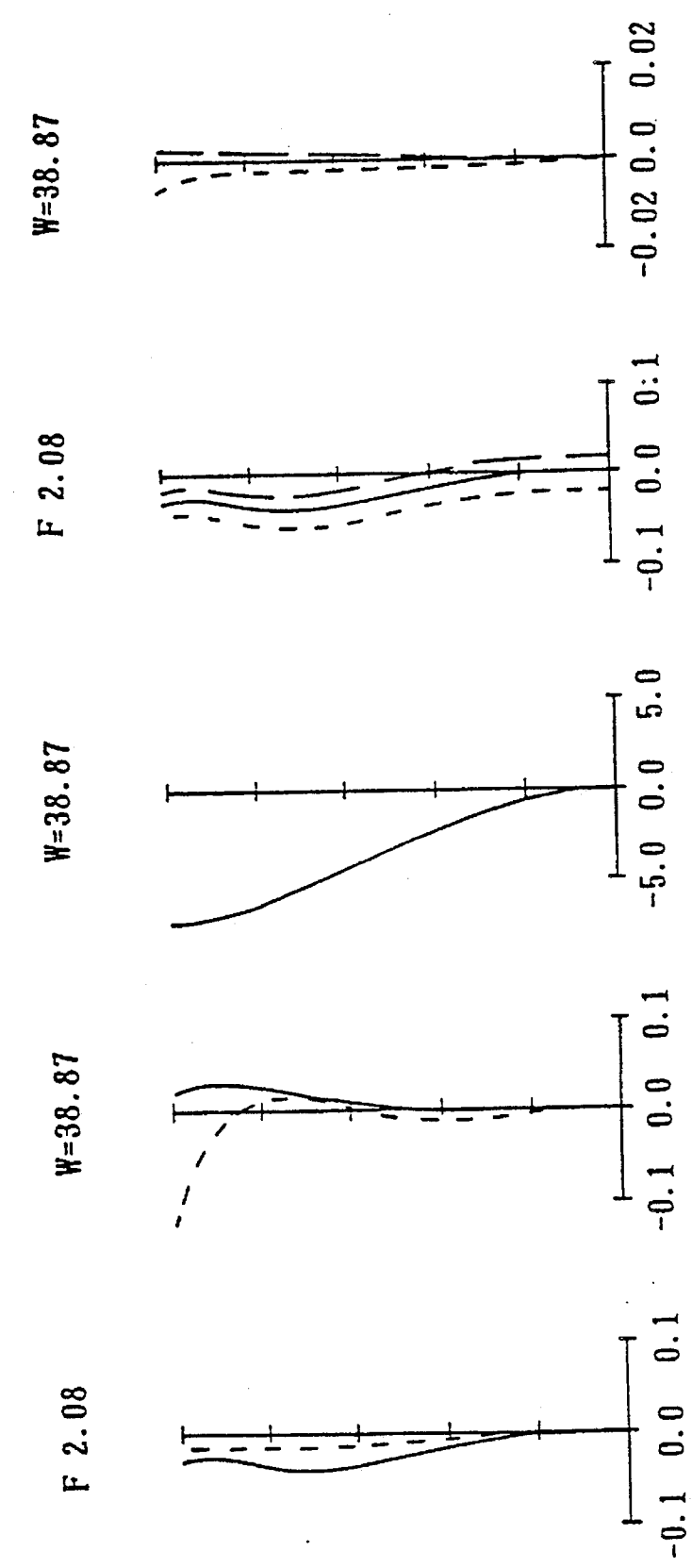

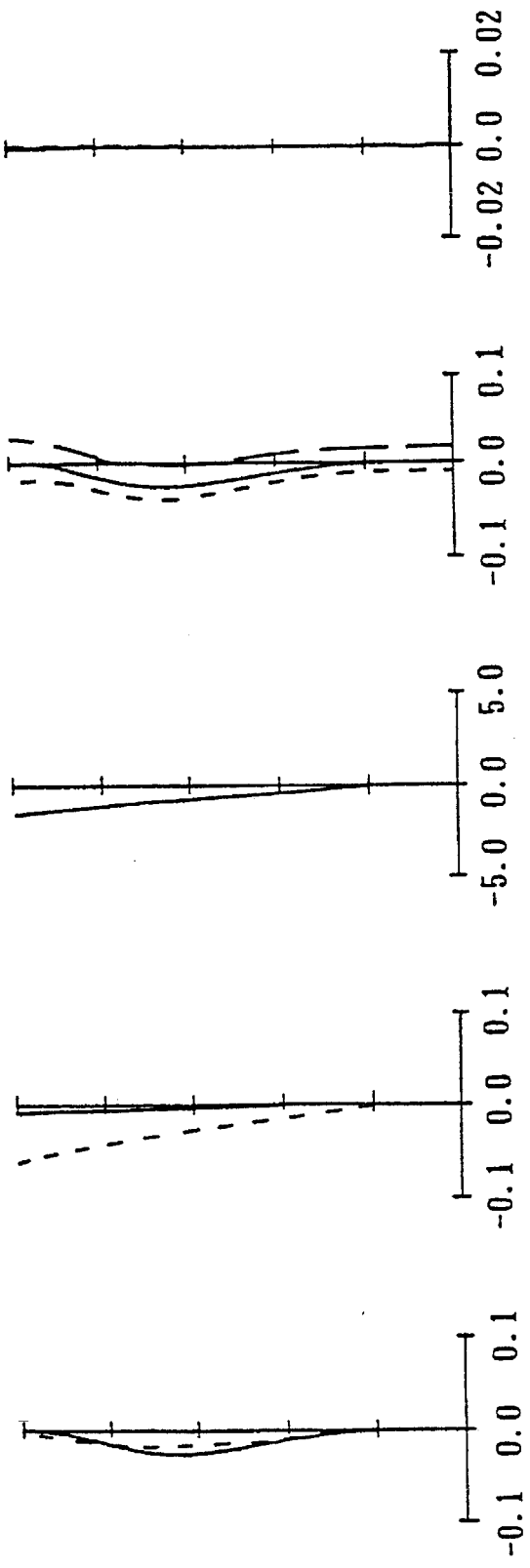

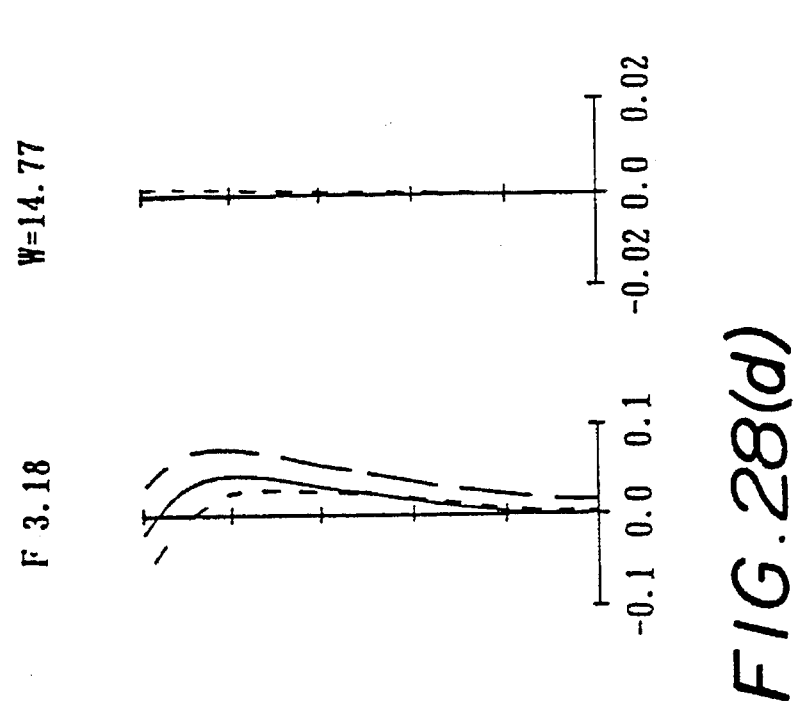
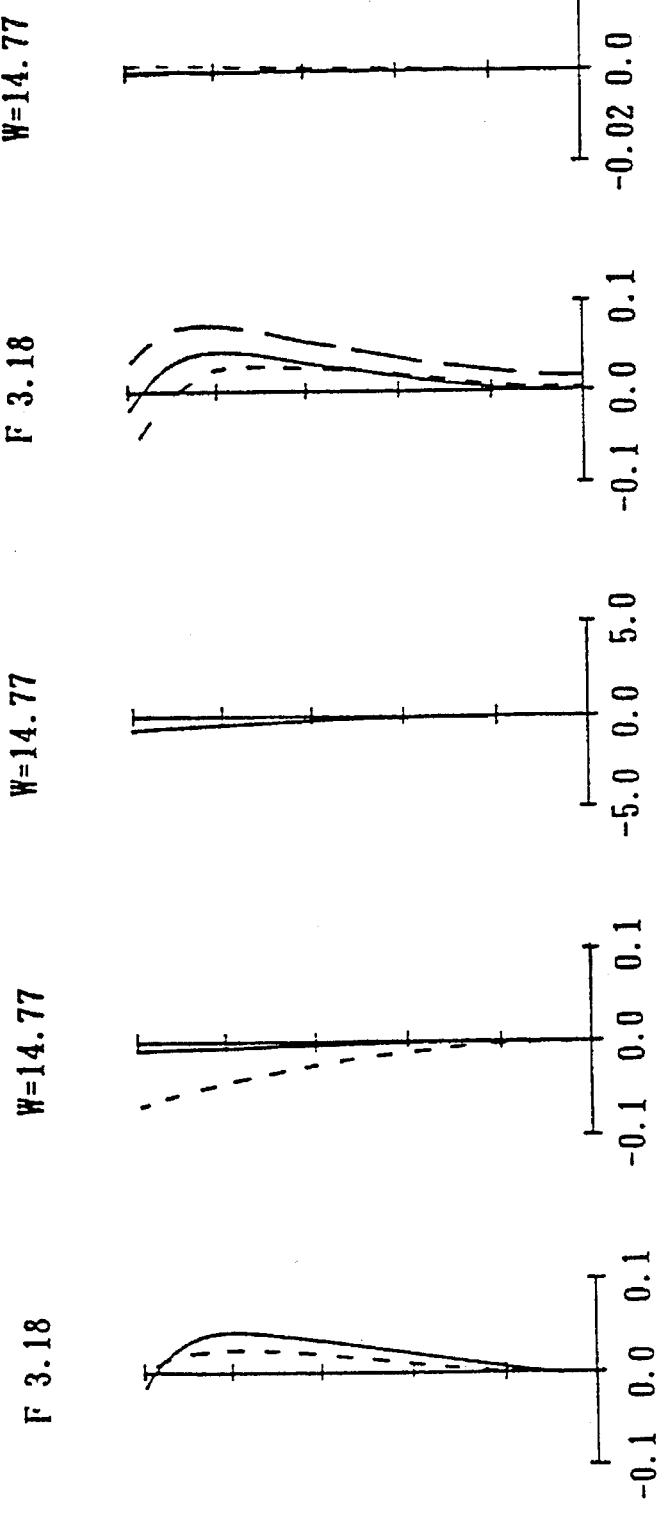

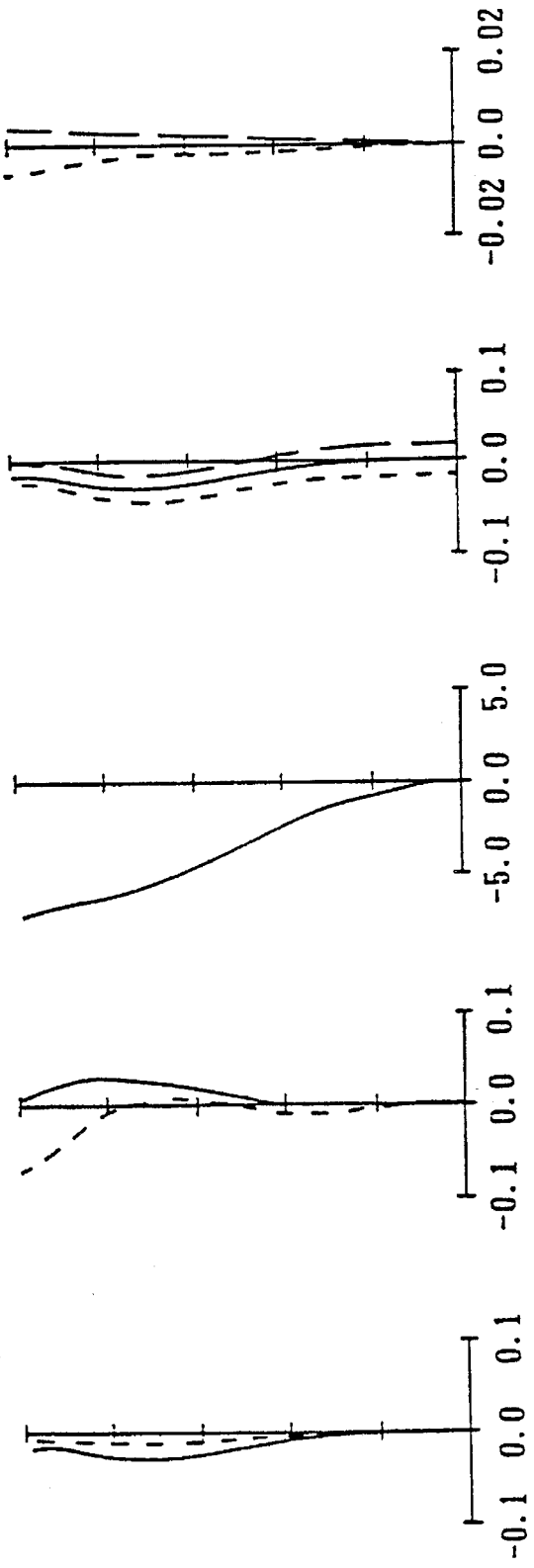

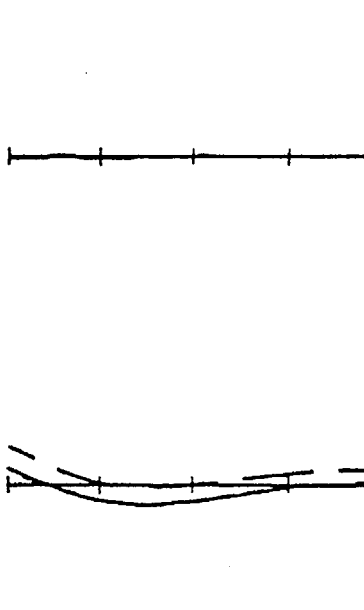
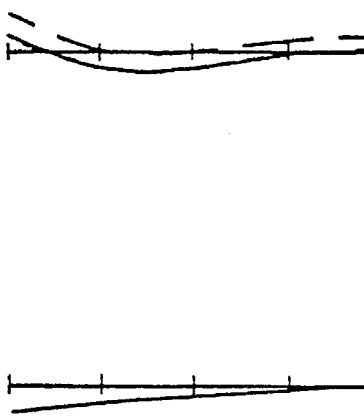
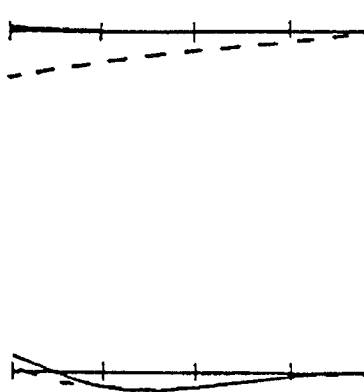
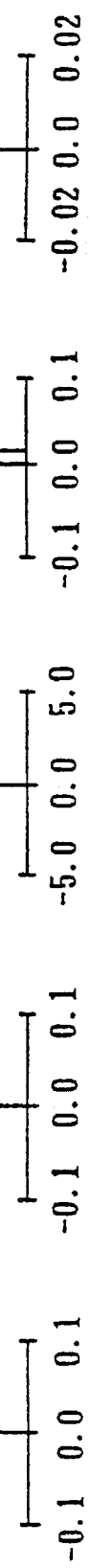

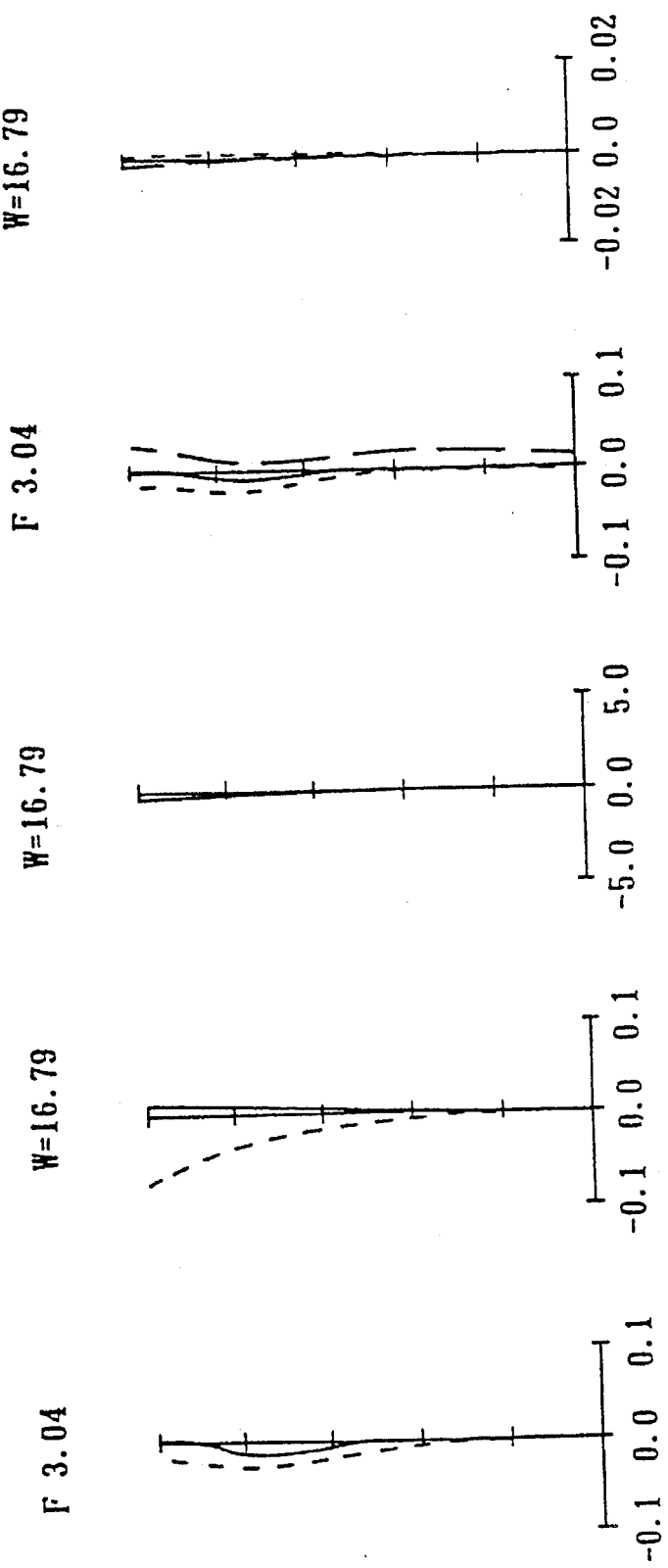

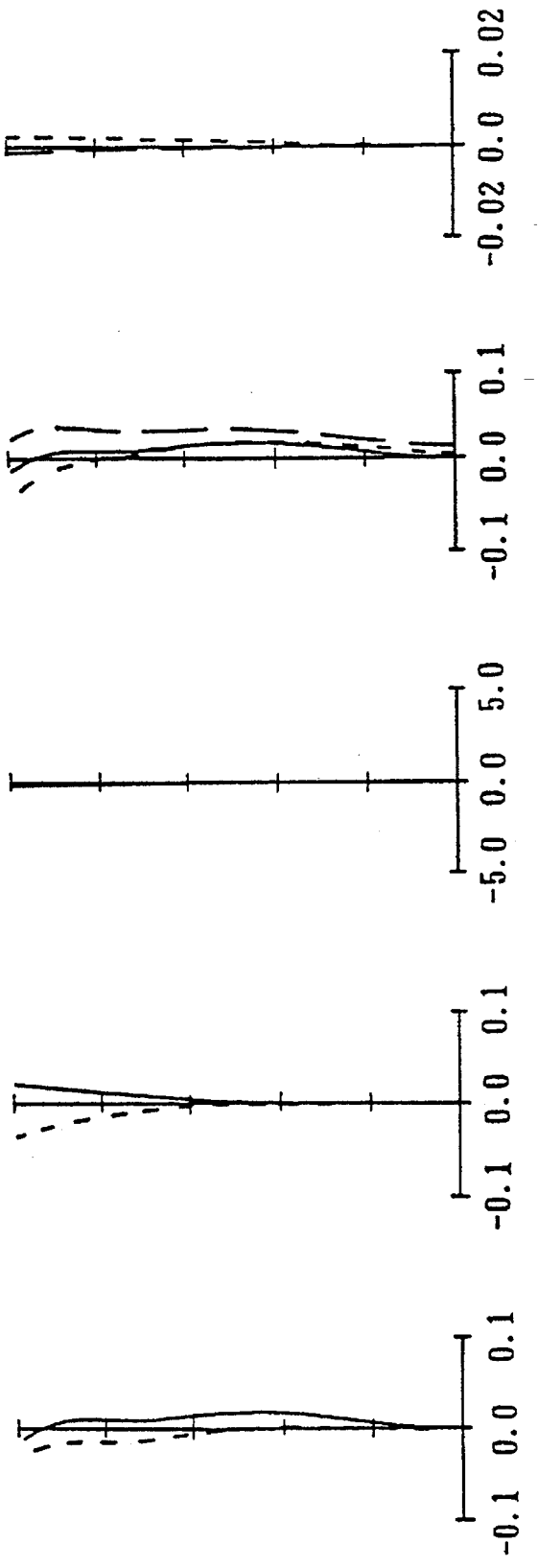

WIDE-ANGEL ASPHERIC ZOOM LENS

BACKGROUND OF THE INVENTION

1. Field of the Invention

The present invention relates to a high-performance wide-angle aspheric zoom lens used for a video camera or the like, having a zoom ratio of approx. 3, a half angle of view of approx. 40° at the wide-angle end, and aberration correction.

2. Related Art of the Invention

High image quality and high performance as well as operability and maneuverability are being demanded from the latest video cameras. Because of this, ⅓ inch high-resolution imaging devices have become popular and ¼ inch imaging devices are now being developed. Thus, these devices have contributed to the decrease in size and weight of video cameras. In addition, a compact, lightweight high-performance wide-angle zoom lens with a large aperture ratio is strongly in demand. Moreover, a decrease in cost is also strongly desired. Therefore, it is necessary to develop a high-performance wide-angle zoom lens comprised of fewer lenses that is machinable and has superior mass production characteristics.

For a high-magnification wide-angle zoom lens, however, the outside diameter of the lens closest to an object increases; moreover several lenses are required to achieve high aberration correction. The size, weight, and price of the zoom lenses increase and therefore zoom lenses cannot be used in consumer video cameras.

For compact and lightweight zoom lenses with a zoom ratio of 2 to 3 and comprising fewer lenses, a two-group zoom lens is frequently used which zooms an object by arranging a lens group with a negative refracting power at the object side and a lens group with a positive refracting power at the image side and changing the distance between both lens groups. For example, the two-group zoom lens disclosed in U.S. Pat. No. 5,155,629 has a zoom ratio of approx. 3, a half angle of view of 27° to 9°, and an F number of 2.8 to 5.7, comprising 7 to 8 lenses. The two-group zoom lens disclosed in Japanese Patent Publication No. Hei 3-16004 has a zoom ratio of approx. 2, a half angle of view of approx. 38° to 17°, and an F number of 4 to 4.5, comprising 10 lenses.

However, the existing two-group zoom lenses having the above constitution cannot simultaneously have a zoom ratio of approx. 3, a half angle of view of approx. 38°, and an F number of 2 because the lens comprises a small number of lenses.

SUMMARY OF THE INVENTION

The present invention is designed to solve the above problems with existing zoom lenses, and its object is to provide a wide-angle aspheric zoom lens with a simple structure having various types of aberration correction, including chromatic aberration, and a zoom ratio of approx. 3 by using a new lens structure and the optimum aspheric arrangement. Another object of the invention is to provide a video camera using the wide-angle aspheric zoom lens.

To achieve the above objects, the present invention is characterized by comprising a first lens group having a negative refracting power and a second lens group having a positive refracting power which are arranged in order from the photographing object side. The lens system zooms by changing the aerial interval between the first and second lens groups, wherein the first lens group has one or more aspheric surfaces and comprises two negative lenses and a positive lens which are arranged in order from the object side; the second lens group has one or more aspheric surfaces and comprises a positive lens, a cemented lens comprising a positive lens and a negative lens, and another positive lens which are arranged in order from the object side. Each lens group has a surface preferable in view of the aberration performance and is made of glass, also preferable in view of the aberration performance.

Concretely, it is preferable that the first lens group comprises two meniscus negative lenses L1 and L2 whose image side is concave and a meniscus positive lens L3 whose image side is concave which are arranged in order from the object side, and one or more surfaces are aspheric.

More concretely, it is preferable that the first lens group meets the following conditions.

(1) $0.3 < fW/|f1| < 0.5$ (2) $0.6 < \{(r2+r4)/|f1|\}/2 < 1.0$ (3) $0.7 < r5/|f1| < 1.5$ (4) $20 < (vL1+vL2)/2 - vL3$.

In the above expressions, fW represents the focal length at the wide angle end; f1 represents the focal length of the first lens group; r2, r4, and r5 represent the radiuses of curvature of the image-side surface of lens L1, the image-side surface of lens L2, and the object-side surface of lens L3 respectively; and vL1, vL2, and vL3 represent the Abbe numbers of lenses L1, L2, and L3 respectively.

More concretely, it is preferable that the second lens group comprises a positive lens L4 whose object and image sides are convex, a cemented lens comprising a positive lens L5 whose object side is convex and a negative lens L6 whose image side is concave, and a positive lens L7 whose object side is convex which are arranged in order from the object side, and that the second lens group has one or more aspheric surfaces.

Furthermore concretely, it is preferable that either the positive lens L5, which is the second lens from the object side of the second lens group, or the positive lens L7, which is the fourth lens from the object side of the second lens group, is a positive lens whose object and image sides have the same radius of curvature.

Furthermore concretely, it is preferable that the second lens group meets the following conditions:

(5) $0.6 < r10/f2 < 3.0$ (6) $0.4 < r12/f2 < 0.8$.

In the above expressions, f2 represents the focal length of the second lens group and r10 and r12 represent the radiuses of curvature of the object side of lens L5 and the image side of lens L6 respectively.

Furthermore concretely, it is preferable that the negative lens L1, which is the first lens from the object side of the first lens group, has one or more aspheric surfaces and meets the following conditions:

(7) $d1/fW > 0.35$.

In the above expression, d1 represents the center thickness of the first negative lens and fW represents the focal length at the wide angle end.

Furthermore concretely, it is preferable that the negative lens L2, which is the second lens from the object side of the first lens group, has one or more aspheric surfaces and meets the following conditions:

(8) $d3/fW > 0.3$.

In the above expression, d3 represents the center thickness of the second negative lens and fW represents the focal length at the wide angle end.

The video camera of the present invention for achieving the above object has at least a wide-angle aspheric zoom lens, an imaging device, a signal processing circuit, and a view finder.

The present invention provides a machinable wide-angle aspheric zoom lens comprising the above simple structure and having a zoom ratio of approx. 3, a half angle of view of approx. 40° at the wide angle end, and an F number of approx. 2 by constituting the first lens group with two negative lenses and a positive lens and the second lens group with a positive lens, a cemented lens comprising a positive lens and a negative lens, and a positive lens, and forming one or more aspheric surfaces in both the first and second lens groups.

Moreover, the present invention provides a high-performance wide-angle aspheric zoom lens with a simple structure having aberration correction by meeting conditions (1) to (6).

Furthermore, by meeting condition (7) or (8), it is possible to use a forming method which is superior in mass production characteristics and also decreases the forming time while realizing an accurate surface shape.

Furthermore, by using the wide-angle zoom lens of the present invention, it is possible to realize a compact, lightweight, high-magnification, and high-image-quality video camera.

As described above, the wide-angle aspheric zoom lens of the present invention makes it possible to realize, for example, a zoom ratio of approx. 3, a half angle of view of approx. 40° at the wide angle end, and an F number of approx. 2 by using a simple machinable structure comprising 7 lenses, and also to realize a compact, lightweight, high-performance video camera.

BRIEF DESCRIPTION OF THE DRAWINGS

FIGS. 2, 3, and 4 show aberration diagrams at the wide-angle-end, standard position, and telephoto end zoom positions of the wide-angle aspheric zoom lens of the first embodiment of the present invention respectively;

FIGS. 5, 6, and 7 show aberration diagrams at the wide-angle-end, standard position, and telephoto end zoom positions of the wide-angle aspheric zoom lens of the second embodiment of the present invention respectively;

FIGS. 8, 9, and 10 show aberration diagrams at the wide-angle-end, standard position, and telephoto end zoom positions of the wide-angle aspheric zoom lens of the third embodiment of the present invention respectively;

FIGS. 11, 12, and 13 show aberration diagrams at the wide-angle-end, standard position, and telephoto end zoom positions of the wide-angle aspheric zoom lens of the fourth embodiment of the present invention respectively;

FIGS. 14, 15, and 16 show aberration diagrams at the wide-angle-end, standard position, and telephoto end zoom positions of the wide-angle aspheric zoom lens of the fifth embodiment of the present invention respectively;

FIGS. 17, 18, and 19 show aberration diagrams at the wide-angle-end, standard position, and telephoto end zoom positions of the wide-angle aspheric zoom lens of the sixth embodiment of the present invention respectively;

FIGS. 20, 21, and 22 show aberration diagrams at the wide-angle-end, standard position, and telephoto end zoom positions of the wide-angle aspheric zoom lens of the seventh embodiment of the present invention respectively;

FIGS. 23, 24, and 25 show aberration diagrams at the wide-angle-end, standard position, and telephoto end zoom positions of the wide-angle aspheric zoom lens of the eighth embodiment of the present invention respectively;

FIGS. 26, 27, and 28 show aberration diagrams at the wide-angle-end, standard position, and telephoto end zoom positions of the wide-angle aspheric zoom lens of the ninth embodiment of the present invention respectively;

FIGS. 29, 30, and 31 show aberration diagrams at the wide-angle-end, standard position, and telephoto end zoom positions of the wide-angle aspheric zoom lens of the tenth embodiment of the present invention respectively;

FIGS. 35, 36, and 37 show aberration diagrams at the wide-angle-end, standard position, and telephoto end zoom positions of the wide-angle aspheric zoom lens of the twelfth embodiment of the present invention respectively.

Each of FIGS. 2–37 includes five separate figures (e.g., FIG. 2(a), FIG. 2(b), FIG. 2(c), FIG. 2(d) and FIG. 2(e)) which are described below in more detail. For convenience, in this application, each group of five figures (e.g., FIG. 2(a), FIG. 2(b), FIG. 2(c), FIG. 2(d) and FIG. 2(e)) also will be referred to by their common prefix number (e.g., "FIG. 2" also will be used to refer to the collection of FIG. 2(a), FIG. 2 (b), FIG. 2(c), FIG. 2(d) and FIG. 2(e)).

In FIGS. 2–37, each aberration diagram, (a), (b), (c), (d), and (e) represents spherical aberration, astigmatism, distortion (%), chromatic spherical aberration, and chromatic aberration of magnification respectively. In the diagram of spherical aberration, a continuous line represents the spherical aberration of the d-line and the dashed line represents the sin condition. In the diagram of astigmatism, a continuous line represents the sagittal image surface curvature and the dashed line represents the meridional image surface curvature. In the diagram of chromatic spherical aberration, the continuous line represents the value for the d-line, the dashed line represents the value for the F-line, and the broken line represents the value for the C-line. In the diagram of chromatic aberration of magnification, the dashed line represents the value for the F-line and the broken line represents the value for the C-line.

DESCRIPTION OF PREFERRED EMBODIMENTS

Embodiments of the present invention are described below by referring the accompanying drawings.

Figure 1:
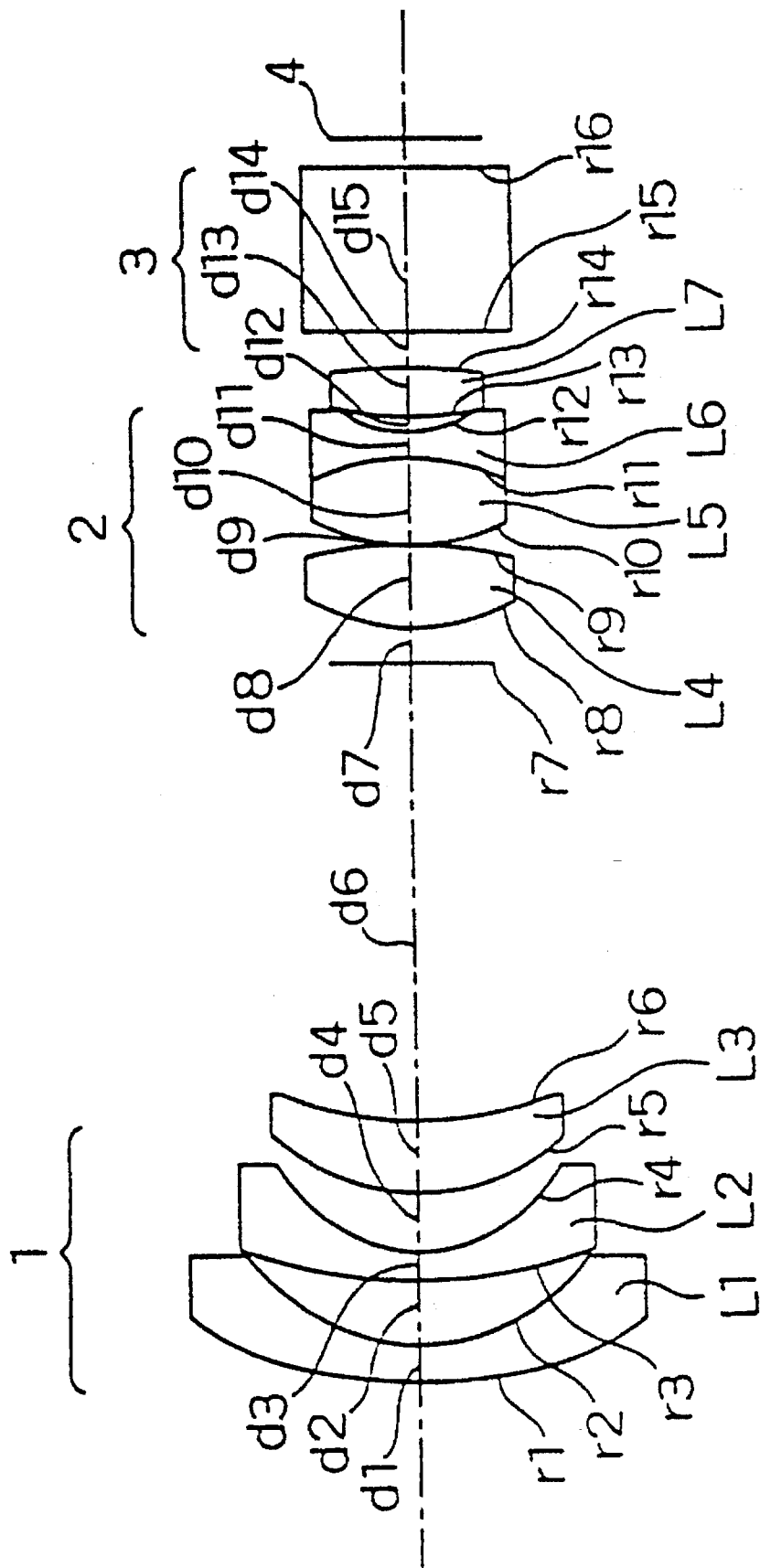
FIG. 1 shows a block diagram of the wide-angle aspheric zoom lens of the first embodiment of the present invention.

FIG. 1 shows a block diagram of the first embodiment of the wide-angle aspheric zoom lens of the present invention. In FIG. 1, a first lens group 1, a second lens group 2, a flat plate 3 optically equivalent to a crystal filter or a face plate of an imaging device, and an image surface 4 are arranged in order from the left.

Zooming is performed by changing the aerial interval between the first lens group 1 having a negative refracting power and the second lens group 2 having a positive refracting power. When necessary, focusing is performed by moving the first lens group 1 along the optical axis or moving both the first lens group 1 and the second lens group along the optical axis.

The first lens group 1 has one or more aspheric surfaces and comprises two negative lenses and a positive lens, and the second lens group 2 has one or more aspheric surfaces and comprises a positive lens, a cemented lens comprising a positive lens and a negative lens, and a positive lens.

The first lens group 1 comprises two meniscus negative lenses L1 and L2 whose image sides are concave and the meniscus positive lens L3 whose image side is concave which are arranged in order from the photographing object side. This first lens group 1 has one or more aspheric surfaces, and it is indispensable that the first lens group 1 include three lenses, in order to realize a half angle of view of approx. 40°, and to correct various types of aberrations. Particularly, the aspheric surface of the first lens group 1 is very effective to correct a distortion.

Each condition of the first lens group 1 is described below in more detail.

Condition (1) deals with the refracting power of the first lens group 1. When the refracting power exceeds an upper limit, the lateral magnification of the second lens group 2 increases, the F number at the narrow-angle side increases, and it is more difficult to correct an aberration. On the contrary, when the refracting power exceeds a lower limit, the lateral magnification of the second lens group 2 decreases, it is more difficult to secure the back focus necessary for insertion of a crystal filter, and the overall lens length and the outside diameter of the lenses of the first lens group 1 increase.

Condition (2) deals with the average value of radiuses of curvature at the image-side surface of lens L1 and that of lens L2. When the average value exceeds a lower limit, the spherical aberration of the narrow-angle side is excessively corrected, and it is more difficult to machine lenses because of too large a curvature. When the average value exceeds an upper limit, it is impossible to simultaneously correct the astigmatism and distortions only by optimizing the aspheric surface.

Condition (3) deals with the radius of curvature of the object-side surface of lens L3. When the radius of curvature exceeds a lower limit, it is more difficult to correct the spherical aberration at the narrow-angle side and also more difficult to machine lenses because of too large a radius of curvature. When the radius of curvature exceeds an upper limit, it is more difficult to correct the coma aberration produced in lenses L1 and L2.

Condition (4) deals with the Abbe numbers of lenses L1, L2, and L3 constituting the first lens group 1. When the Abbe number exceeds a lower limit, it is impossible to correct the chromatic aberration of magnification at the wide-angle side. Moreover, it is difficult to simultaneously correct the chromatic spherical aberration and chromatic aberration of magnification at the narrow-angle side.

The conditions in the second lens group comprises the positive lens L4 whose object and image sides are convex, the cemented lens comprising the positive lens L5 whose object side is convex and the negative lens L6 whose image side is concave, and the positive lens L7 whose object side is convex which are arranged in order from the object side. This second lens group 2 has one or more aspheric surfaces, and it is indispensable that the second lens group 2 include four lenses, in order to realize a large aperture ratio of approx. F 2 at the wide-angle side and approx. F 3 at the narrow-angle side, and to correct various types of monochromatic aberrations and chromatic aberration. Particularly, the aspheric surface of the second lens group 2 is very effective to correct spherical aberration.

The condition that the object-side surface and the image-side surface of the positive lens L5, which is the second lens from the object side of the second lens group 2, or the positive lens L7, which is the fourth lens from the object side of the second lens group 2, have the same radius of curvature provides a large advantage in manufacturing a zoom lens comprising a small lens whose object- and image-side radiuses of curvature are very difficult to differentiate so that it is not inversely inserted when assembling the zoom lens.

Each condition of the second lens group 2 is described below in more detail.

Condition (5) deals with the radius of curvature of the object-side surface of lens L5. When the radius of curvature exceeds a lower limit, the coma aberration, which is higher than the principal ray, is excessively corrected for an object point lower than the optical axis, and it is more difficult to machine the lens because the radius of curvature is too large. When the radius of curvature exceeds an upper limit, it is more difficult to secure the back focus necessary for insertion of a crystal filter or the like because the position of the image-side principal point of the second lens group 2 approaches the object side.

Condition (6) deals with the radius of curvature of the image-side surface of lens L7. When the radius of curvature exceeds a lower limit, a large flare due to the coma aberration upper than the principal ray is produced for an object point lower than the optical axis, and it is more difficult to machine the lens because the radius of curvature is too large. When the radius of curvature exceeds an upper limit, it is more difficult to correct astigmatism.

Table 1 shows concrete numerical values.

In Table 1, the symbol "r" represents the radius of curvature of a lens surface, "d" represents the thickness of a lens or the aerial interval between lenses, "n" represents the refractive index for the d-line of each lens, "v" represents the Abbe number for the d-line of each lens.

The aspheric surface is defined as the following expression (1).

$$Z = \frac{CY^2}{1+\sqrt{1-C^2Y^2}} + D \cdot Y^4 + E \cdot Y^6 + F \cdot Y^8 + G \cdot Y^{10} \qquad (1)$$

Z: Distance of point on aspheric surface from aspheric surface apex when height from the optical axis equals Y Y: Height from optical axis C: Curvature of aspheric surface apex D, E, F, and G: Aspheric surface factor The first and eighth surfaces are aspheric, and the aspheric surface factor is shown in Table 2.

Table 3 shows the value for an object point at a position 2 m from the lens tip as an example of the aerial interval which can be changed by zooming. Table 4 shows the value of each conditional expression. In these tables, the standard position is a zoom position for the minimum lens length. Symbols f, F/NO, and W represent the focal length, F number, and half angle of view at each zoom position respectively.

Table 5 shows the second numerical embodiment. The first, eighth, and ninth surfaces are aspheric, and the aspheric surface factor of each surface is shown in Table 6. Table 7 shows the value for an object point at a position 2 m from the lens tip as an example of the aerial interval which can be changed by zooming. Table 8 shows the value of each conditional expression. Symbols f, F/NO, and W represent the focal length, F number, and half angle of view at each zoom position respectively.

Table 9 shows the third numerical embodiment. The first and eighth surfaces are aspheric, and the aspheric factor is shown in Table 10. Table 11 shows the value for an object point at a position 2 m from the lens tip as an example of the aerial interval which can be changed by zooming, and Table 12 shows the value of each conditional expression. Symbols f, F/NO, and W represent the focal length, F number, and half angle of view at each zoom position respectively.

Table 13 shows the fourth numerical embodiment. The third and eighth surfaces are aspheric, and the aspheric surface factor is shown in Table 14. Table 15 shows the value for an object point at a position 2 m from the lens tip as an example of the aerial interval which can be changed by zooming, and Table 16 shows the value of each conditional expression. Symbols f, F/NO, and W represent the focal length, F number, and half angle of view at each zoom position respectively.

Table 17 shows the fifth numerical embodiment. The first and tenth surfaces are aspheric, and the aspheric surface factor is shown in Table 18. Table 19 shows the value for an object point at a position 2 m from the lens tip as an example of the aerial interval which can be changed by zooming, and Table 20 shows the value of each conditional expression. Symbols f, F/NO, and W represent the focal length, F number, and half angle of view at each zoom position respectively.

Table 21 shows the sixth numerical embodiment. The first, eighth, and ninth surfaces are aspheric, and the aspheric surface factor is shown in Table 22. Table 23 shows the value for an object point at a position 2 m from the lens tip as an example of the aerial interval which can be changed by zooming, and Table 24 shows the value of each conditional expression. Symbols f, F/NO, and W represent the focal length, F number, and half angle of view at each zoom position respectively.

Table 25 shows the seventh numerical embodiment. The first, eighth, and ninth surfaces are aspheric, and the aspheric surface factor is shown in Table 26. Table 27 shows the value for an object point at a position 2 m from the lens tip as an example of the aerial interval which can be changed by zooming, and Table 28 shows the value of each conditional expression. Symbols f, F/NO, and W represent the focal length, F number, and half angle of view at each zoom position respectively.

Table 29 shows the eighth numerical embodiment which is a concrete numerical example for meeting condition (7) of the center thickness d1 of lens L1 of the first lens group. The first, eighth, and ninth surfaces are aspheric, and the aspheric, surface factor is shown in Table 30. Table 31 shows the value for an object point at a position 2 m from the lens tip as an example of the aerial interval which can be changed by zooming, and Table 32 shows the value of each conditional expression. Symbols f, F/NO, and W represent the focal length, F number, and half angle of view at each zoom position respectively.

Table 33 shows the ninth numerical embodiment which is another concrete numerical example for meeting condition (7). The first, eighth, and ninth surfaces are aspheric, and the aspheric surface factor is shown in Table 34. Table 35 shows the value for an object point at a position 2 m from the lens tip as an example of the aerial interval which can be changed by zooming, and Table 36 shows the value of each conditional expression. Symbols f, F/NO, and W represent the focal length, F number, and half angle of view at each zoom position respectively.

Table 37 shows the tenth numerical embodiment which is still another concrete numerical example for meeting condition (7). The first, eighth, and ninth surfaces are aspheric, and the aspheric surface factor is shown in Table 38, Table 39 shows the value for an object point at a position 2 m from the lens tip as an example of the aerial interval which can be changed by zooming, and Table 40 shows the value of each conditional expression. Symbols f, F/NO, and W represent the focal length, F number, and half angle of view at each zoom position respectively.

Table 41 shows the eleventh numerical embodiment which is a concrete numerical example for meeting condition (8) of the center thickness d3 of lens L2 of the first lens group. The third and eighth surfaces are aspheric, and the aspheric surface factor is shown in Table 42. Table 43 shows the value for an object point at a position 2 m from the lens tip as an example of the aerial interval which can be changed by zooming and Table 44 shows the value of each conditional expression. Symbols f, F/NO, and W represent the focal length, F number, and half angle of view at each zoom position respectively.

Table 45 shows the twelfth numerical embodiment which is another concrete numerical example for meeting condition (8). The third and eighth surfaces are aspheric, and the aspheric surface factor is shown in Table 46. Table 47 shows the value for an object point at a position 2 m from the lens tip as an example of the aerial interval which can be changed by zooming, and Table 48 shows the value of each conditional expression. Symbols f, F/NO, and W represent the focal length, F number, and half angle of view at each zoom position respectively.

Figures 12A, 12B, 12C:
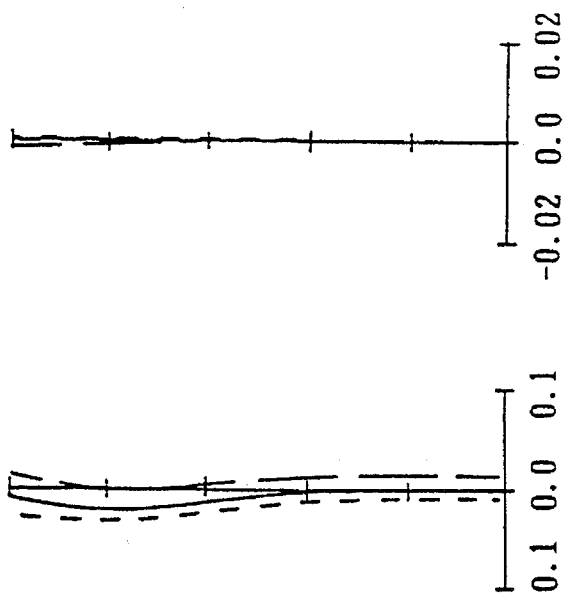
Figures 12D, 12E:
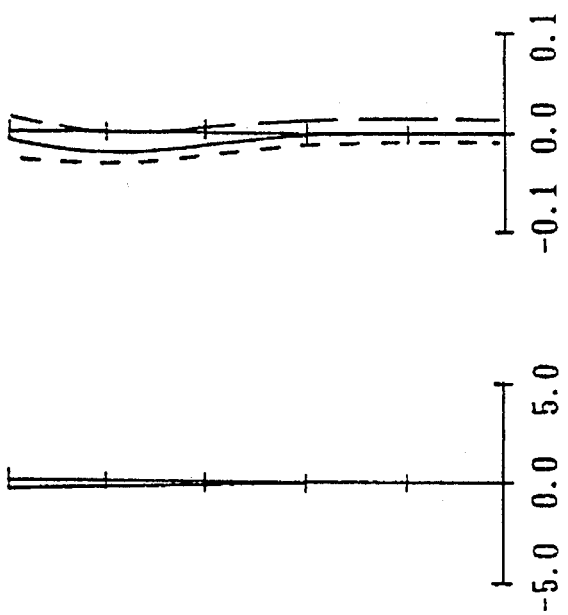
Figures 14A, 14B, 14C, 14D, 14E:
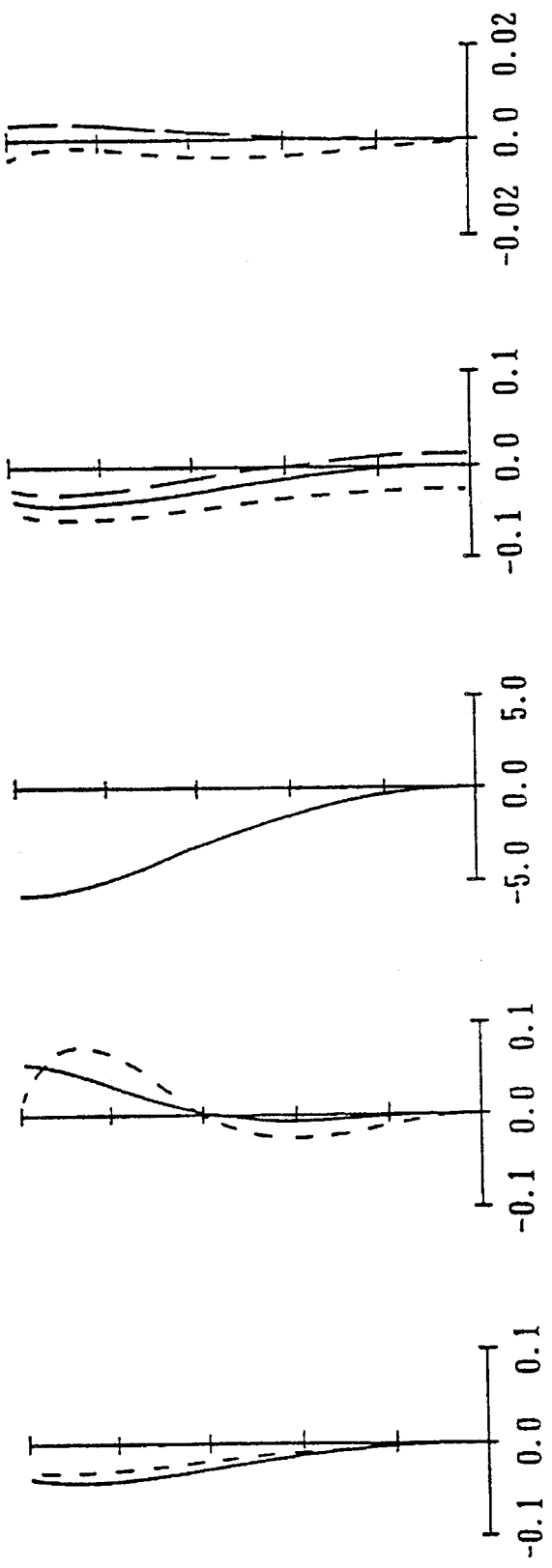
Figures 15A, 15B, 15C, 15D, 15E:
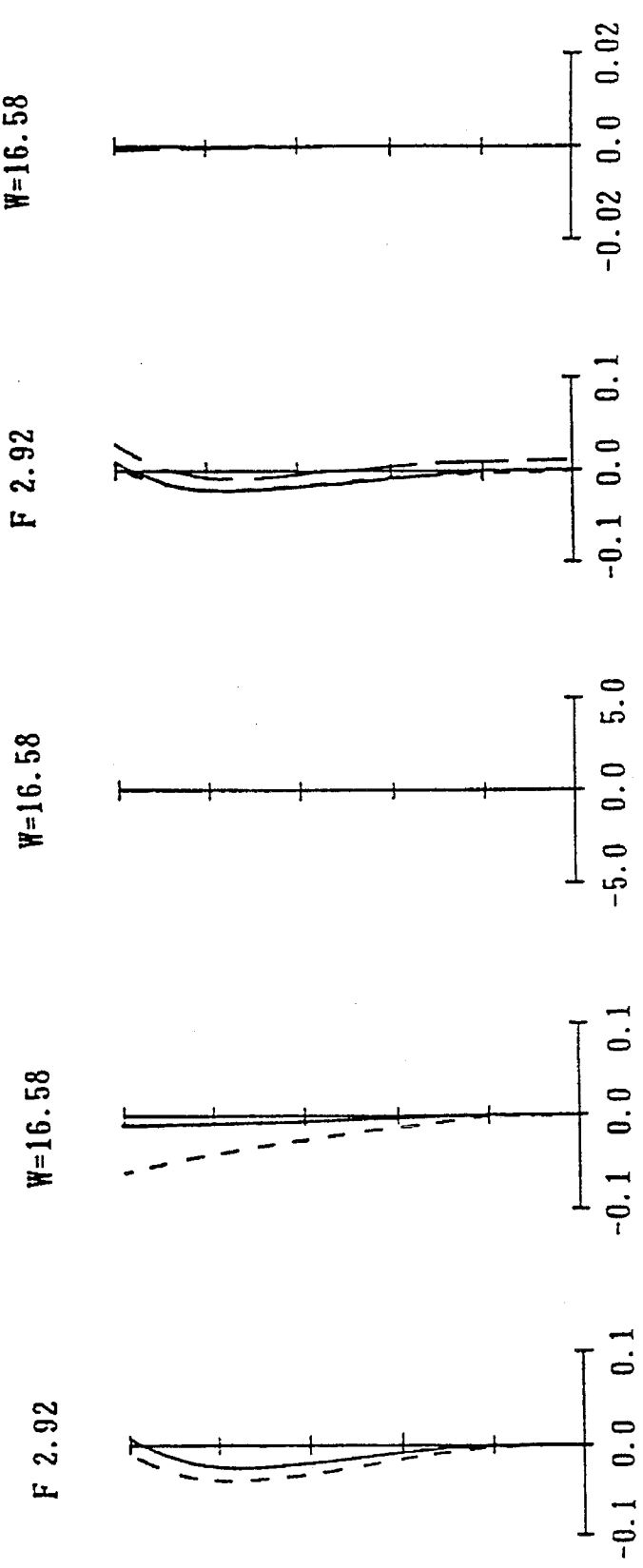
Figures 23A, 23B, 23C, 23D, 23E:
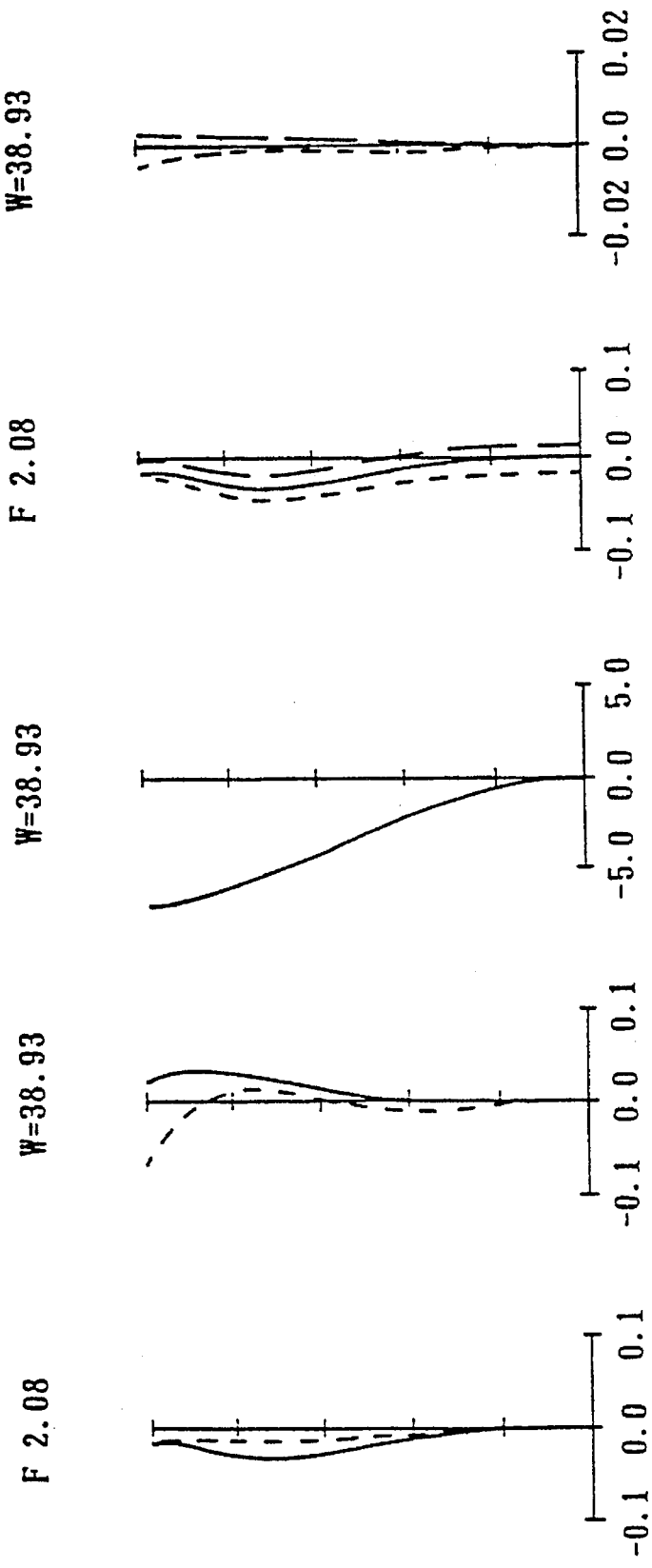
Figures 31A, 31B, 31C, 31D, 31E:
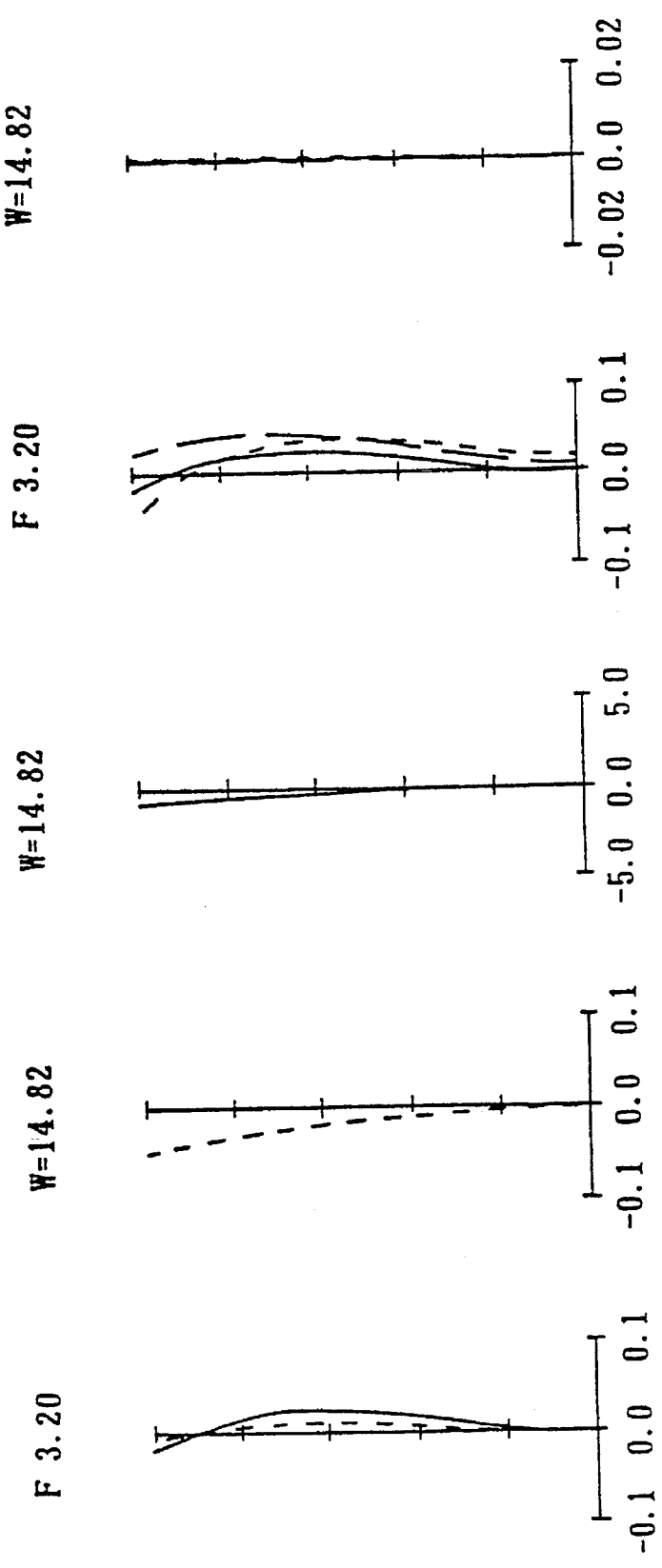
Figures 32A, 32B, 32C, 32D, 32E:
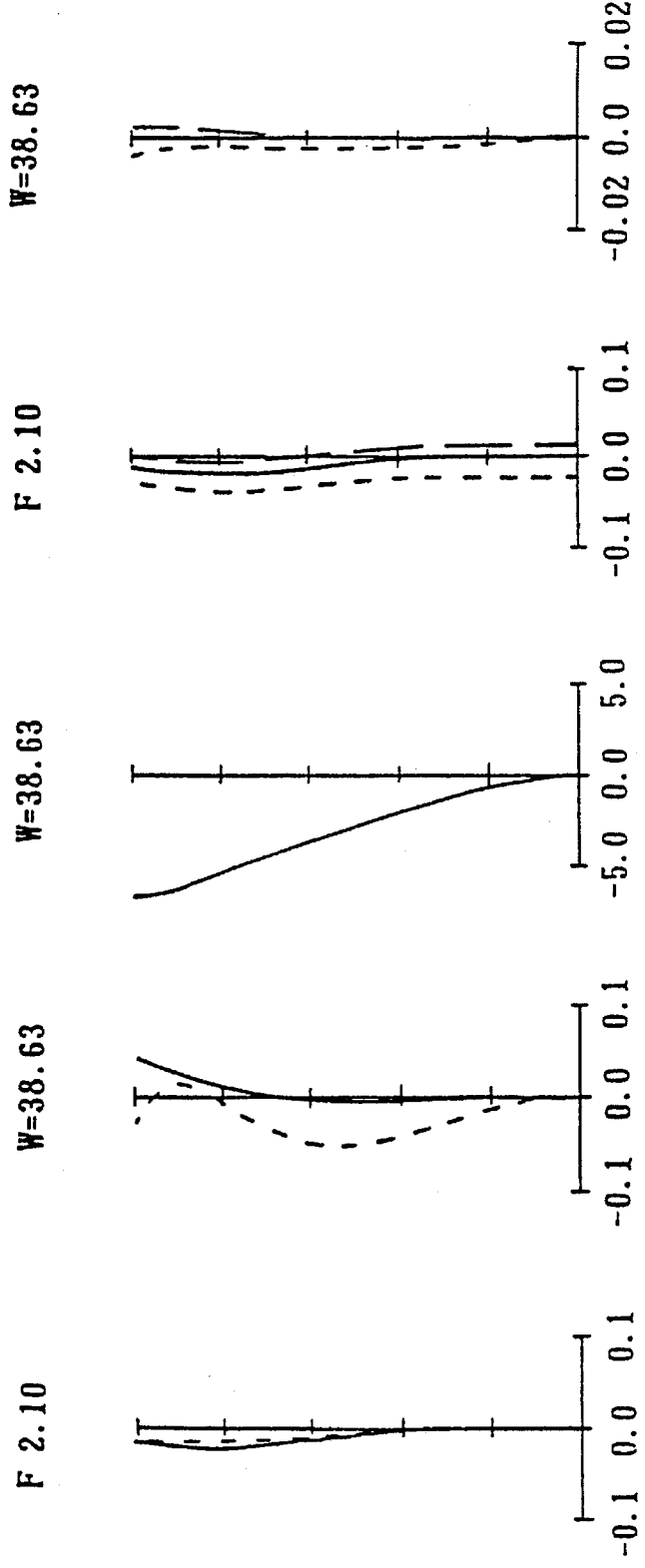
FIGS. 32, 33, and 34 show aberration diagrams at the wide-angle-end, standard position, and telephoto end zoom positions of the wide-angle aspheric zoom lens of the eleventh embodiment of the present invention respectively.
Figures 33A, 33B, 33C, 33D, 33E:
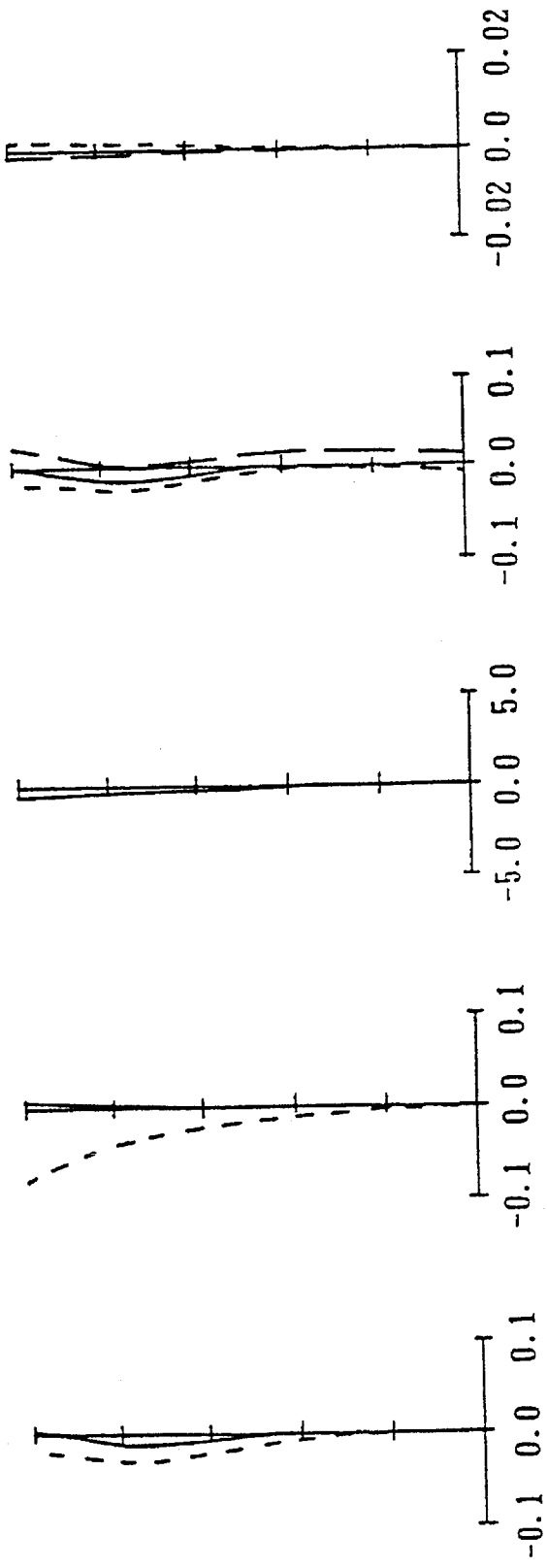
Figures 34A, 34B, 34C, 34D, 34E:
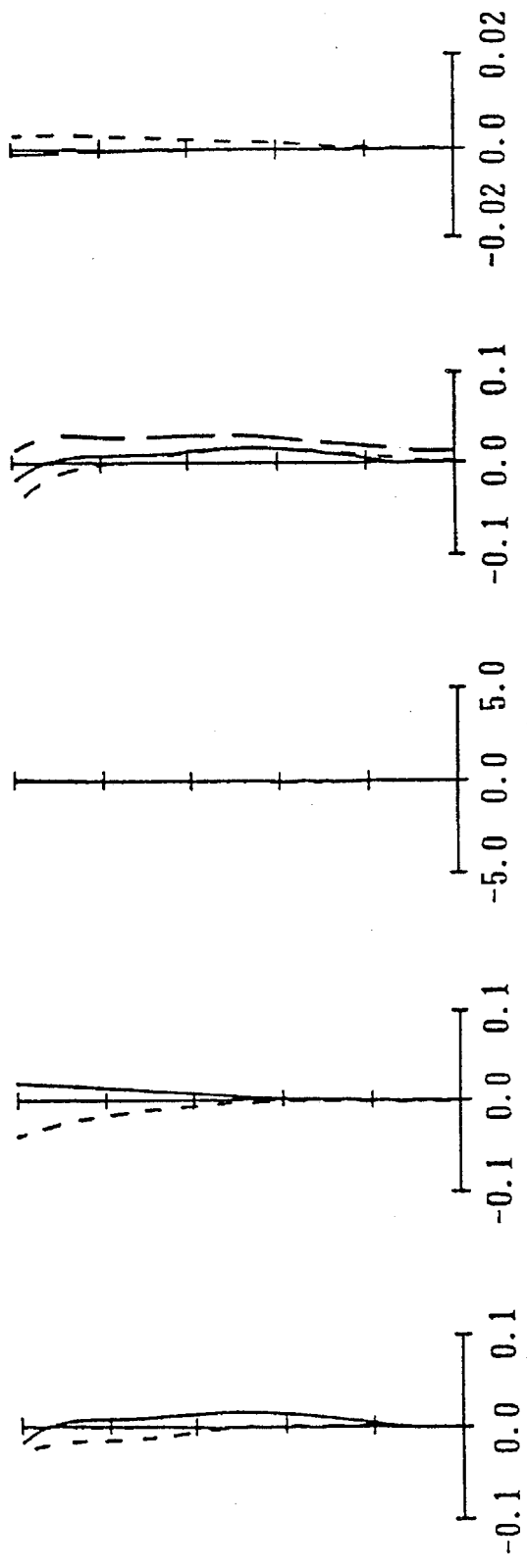
Figures 35A, 35B, 35C, 35D, 35E:
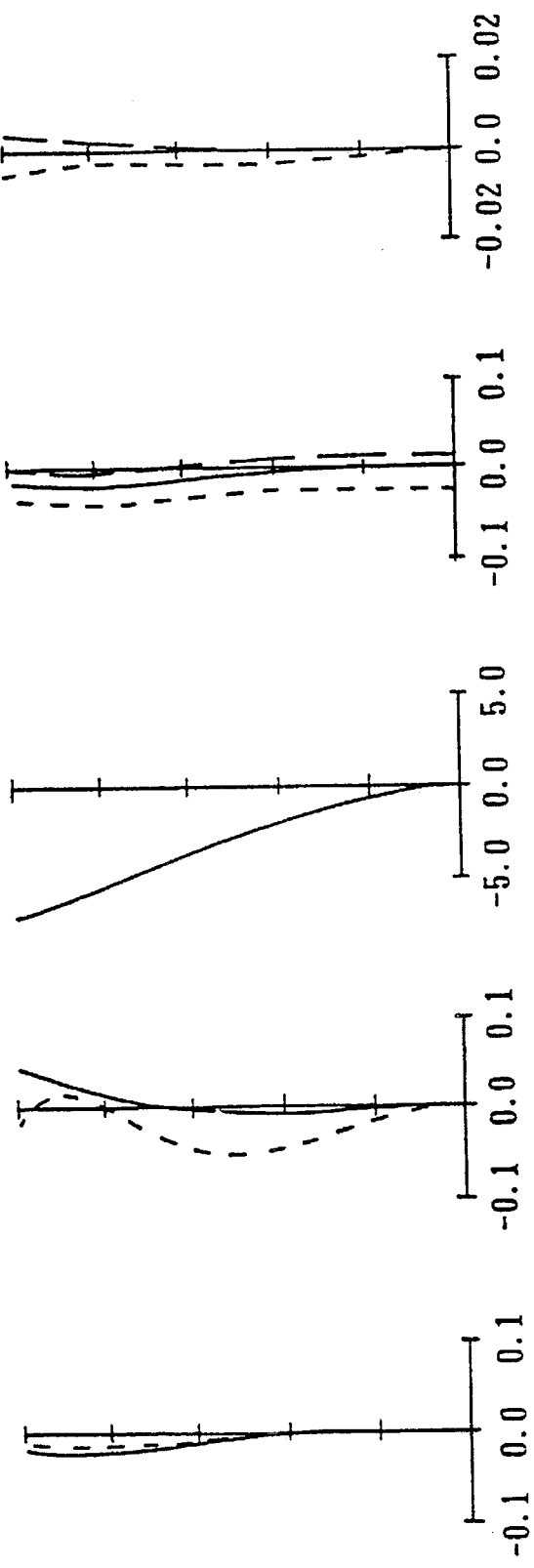

FIGS. 2, 3, and 4 show aberration diagrams at the wide-angle-end, standard position, and telephoto end zoom positions of the aspheric zoom lens of the first embodiment shown in Table 1 respectively. FIGS. 5, 6, and 7 show aberration performances of the aspheric zoom lens of the second embodiment shown in Table 5 respectively; FIGS. 8, 9, and 10 show aberration performances of the aspheric zoom lens of the third embodiment shown in Table 9 respectively; FIGS. 11, 12, and 13 show aberration performances of the aspheric zoom lens of the fourth embodiment shown in Table 13 respectively; FIGS. 14, 15, and 16 show aberration performances of the aspheric zoom lens of the fifth embodiment shown in Table 17 respectively; FIGS. 17, 18, and 19 show aberration performances of the aspheric zoom lens of the sixth embodiment shown in Table 21 respectively; FIGS. 20, 21, and 22 show aberration performances of the aspheric zoom lens of the seventh embodiment shown in Table 25 respectively; FIGS. 23, 24, and 25 show aberration performances of the aspheric zoom lens of the eighth embodiment shown in Table 29 respectively;

FIGS. 26, 27, and 28 show aberration performances of the aspheric zoom lens of the ninth embodiment shown in Table 33 respectively; FIGS. 29, 30, and 31 show aberration performances of the aspheric zoom lens of the tenth embodiment shown in Table 37 respectively; FIGS. 32, 33, and 34 show aberration performances of the aspheric zoom lens of the eleventh embodiment shown in Table 41 respectively; and FIGS. 35, 36, and 37 show aberration performances of the aspheric zoom lens of the twelfth embodiment shown in Table 45 respectively. From these figures, it is found that each embodiment has a preferable optical performance in which both the monochromatic aberration and the chromatic aberration are well corrected.

Figure 38:
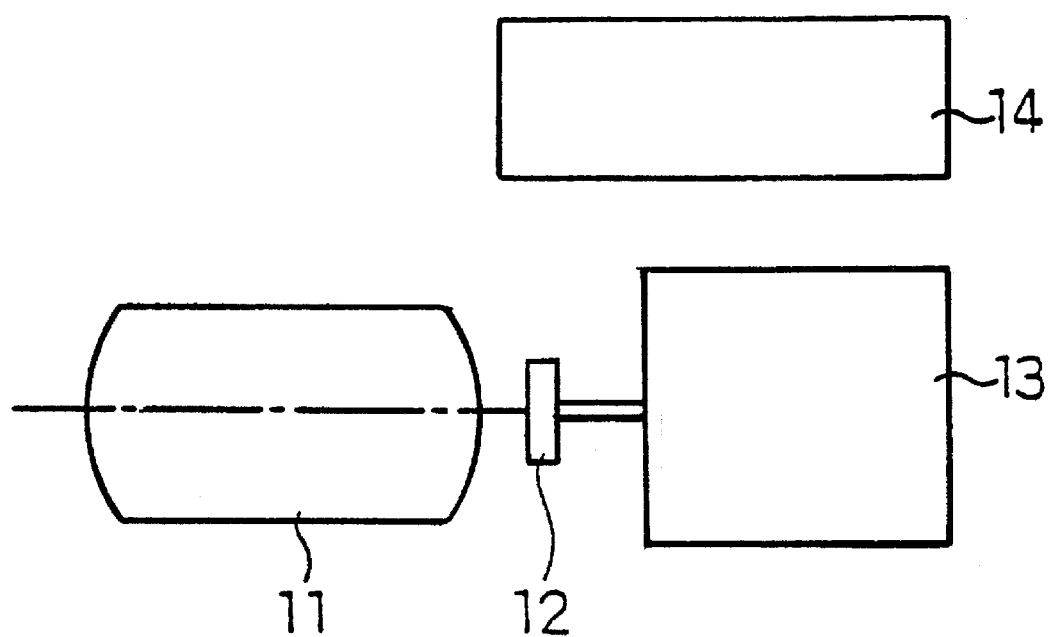
FIG. 38 shows an illustration of the structure of the video camera of the present invention.

The video camera of the present invention, as shown in FIG. 38, comprises at least the wide-angle aspheric zoom lens 11, imaging device 12, signal processing circuit 13, and view finder 14 of the above embodiments. Therefore, it is possible to realize a compact, lightweight, high-performance video camera.

In the above description, a case is described in which the object-side surface of lens L1 or L2 of the first lens group 1 is aspheric. However, it is also possible to apply the present invention to a case in which the other surface is aspheric.

In the above description, a case is described in which lens L4 or L5 of the second lens group 2 is aspheric. However, it is also possible to apply the present invention to a case in which the other surface is aspheric.

TABLE 1

First embodiment

| Group | Surface | r | d | n | v |
|---|---|---|---|---|---|
| 1 | 1 | 19.224 | 1.00 | 1.67790 | 55.5 |
|  | 2 | 6.088 | 1.78 |  |  |
|  | 3 | 15.522 | 0.80 | 1.77250 | 49.6 |
|  | 4 | 4.702 | 1.59 |  |  |
|  | 5 | 6.364 | 2.00 | 1.80518 | 25.5 |
|  | 6 | 10.423 | Variable |  |  |
|  | 7 |  | 1.00 |  |  |
| 2 | 8 | 5.898 | 2.30 | 1.60311 | 60.7 |
|  | 9 | −15.228 | 0.10 |  |  |
|  | 10 | 6.820 | 2.40 | 1.58913 | 61.2 |
|  | 11 | −6.813 | 0.70 | 1.71736 | 29.5 |
|  | 12 | 3.521 | 0.41 |  |  |
|  | 13 | 9.259 | 1.40 | 1.64769 | 33.9 |
|  | 14 | −23.627 | Variable |  |  |
| 3 | 15 | ∞ | 4.50 | 1.51633 | 64.1 |
|  | 16 | ∞ | — |  |  |

TABLE 2

Aspheric surface factor of first embodiment

| Surface | 1 | 8 |
|---|---|---|
| D | 2.632E-4 | −7.416E-4 |
| E | 1.277E-6 | −3.294E-6 |
| F | −5.798E-8 | −1.715E-6 |
| G | 1.685E-9 | 7.732E-8 |

TABLE 3

Zoom interval of first embodiment for 2-m object point

|  | Wide-angle end | Standard position | Telephoto end |
|---|---|---|---|
| f | 3.000 | 7.481 | 8.672 |
| F/NO | 2.061 | 2.954 | 3.198 |
| d6 | 13.072 | 2.646 | 1.688 |
| d14 | 1.000 | 5.170 | 6.281 |

TABLE 4

Value of conditional expression of first embodiment

| fW/|f1| | 0.40 | (r2 + r4)/2/|f1| | 0.72 |
|---|---|---|---|
| r5/|f1| | 0.85 | (vL1 + vL2)/2 − vL3 | 27.1 |
| r10/f2 | 0.98 | r12/f2 | 0.51 |

TABLE 5

Second embodiment

| Group | Surface | r | d | n | v |
|---|---|---|---|---|---|
| 1 | 1 | 21.638 | 1.00 | 1.72000 | 50.3 |
|  | 2 | 6.101 | 1.54 |  |  |
|  | 3 | 29.470 | 0.80 | 1.77250 | 49.6 |
|  | 4 | 4.592 | 1.75 |  |  |
|  | 5 | 7.155 | 2.00 | 1.80518 | 25.5 |
|  | 6 | 14.443 | Variable |  |  |
|  | 7 |  | 1.00 |  |  |
| 2 | 8 | 6.013 | 2.50 | 1.58904 | 53.2 |
|  | 9 | −13.033 | 0.10 |  |  |
|  | 10 | 16.018 | 2.20 | 1.58913 | 61.2 |
|  | 11 | −16.330 | 0.60 | 1.75520 | 27.5 |
|  | 12 | 4.478 | 0.28 |  |  |
|  | 13 | 7.231 | 1.80 | 1.54072 | 47.2 |
|  | 14 | −10.888 | Variable |  |  |
| 3 | 15 | ∞ | 4.50 | 1.51633 | 64.1 |
|  | 16 | ∞ | — |  |  |

TABLE 6

Aspheric surface factor of second embodiment

| Surface | 1 | 8 | 9 |
|---|---|---|---|
| D | 3.520E-4 | −9.794E-4 | −2.321E-5 |
| E | 5.763E-6 | −1.668E-5 | −2.013E-5 |
| F | −2.113E-7 | −1.536E-6 | −1.278E-6 |
| G | 4.373E-9 | −2.046E-7 | −1.492E-7 |

TABLE 7

Zoom interval of second embodiment for 2-m object point

|  | Wide-angle end | Standard position | Telephoto end |
|---|---|---|---|
| f | 3.001 | 6.253 | 8.681 |
| F/NO | 2.058 | 2.714 | 3.434 |
| d6 | 12.275 | 3.781 | 1.589 |
| d14 | 1.000 | 4.670 | 7.715 |

TABLE 8

Value of conditional expression of second embodiment

| fW/|f1| | 0.48 | (r2 + r4)/2/|f1| | 0.85 |
|---|---|---|---|
| r5/|f1| | 1.41 | (vL1 + vL2)/2 − vL3 | 25.5 |
| r10/f2 | 2.05 | r12/f2 | 0.57 |

TABLE 9

Third embodiment

| Group | Surface | r | d | n | v |
|---|---|---|---|---|---|
| 1 | 1 | 14.000 | 1.00 | 1.67790 | 55.5 |
|  | 2 | 6.364 | 1.96 |  |  |
|  | 3 | 13.381 | 0.80 | 1.71300 | 53.9 |
|  | 4 | 4.879 | 2.48 |  |  |
|  | 5 | 6.323 | 2.00 | 1.80518 | 25.5 |
|  | 6 | 7.698 | Variable |  |  |
|  | 7 |  | 1.00 |  |  |
| 2 | 8 | 6.619 | 2.00 | 1.60311 | 60.7 |
|  | 9 | −16.017 | 0.10 |  |  |
|  | 10 | 5.907 | 2.60 | 1.58913 | 61.2 |
|  | 11 | −12.369 | 0.70 | 1.74000 | 28.2 |
|  | 12 | 3.479 | 0.47 |  |  |
|  | 13 | 12.440 | 1.40 | 1.60342 | 38.0 |
|  | 14 | −14.102 | Variable |  |  |
| 3 | 15 | ∞ | 4.50 | 1.51633 | 64.1 |
|  | 16 | ∞ | — |  |  |

TABLE 10

Aspheric surface factor of third embodiment

| Surface | 1 | 8 |
|---|---|---|
| D | 2.081E-4 | −6.006E-4 |
| E | −1.412E-6 | −1.794E-6 |
| F | 6.306E-8 | −1.346E-6 |
| G | 4.72E-12 | 6.656E-8 |

TABLE 11

Zoom interval of third embodiment for 2-m object point

| | Wide-angle end | Standard position | Telephoto end |
|---|---|---|---|
| f | 3.000 | 8.416 | 8.659 |
| F/NO | 2.075 | 3.064 | 3.109 |
| d6 | 14.655 | 1.835 | 1.636 |
| d14 | 1.000 | 5.549 | 5.754 |

TABLE 12

Value of conditional expression of third embodiment

| fW/|f1| | 0.36 | (r2 + r4)/2/|f1| | 0.66 |
|---|---|---|---|
| r5/|f1| | 0.75 | (vL1 + vL2)/2 − vL3 | 29.2 |
| r10/f2 | 0.84 | r12/f2 | 0.49 |

TABLE 13

Fourth embodiment

| Group | Surface | r | d | n | v |
|---|---|---|---|---|---|
| 1 | 1 | 17.145 | 1.00 | 1.67790 | 55.5 |
| | 2 | 5.693 | 1.30 | | |
| | 3 | 13.056 | 0.80 | 1.77250 | 49.6 |
| | 4 | 4.734 | 2.13 | | |
| | 5 | 7.040 | 2.00 | 1.80518 | 25.5 |
| | 6 | 10.692 | Variable | | |
| | 7 | | 1.00 | | |
| 2 | 8 | 6.267 | 2.20 | 1.60311 | 60.7 |
| | 9 | −17.740 | 0.10 | | |
| | 10 | 5.672 | 2.40 | 1.58913 | 61.2 |
| | 11 | −16.316 | 0.70 | 1.74000 | 28.2 |
| | 12 | 3.249 | 0.43 | | |
| | 13 | 7.879 | 1.40 | 1.60342 | 38.0 |
| | 14 | −33.197 | Variable | | |
| 3 | 15 | ∞ | 4.50 | 1.51633 | 64.1 |
| | 16 | ∞ | — | | |

TABLE 14

Aspheric surface factor of fourth embodiment

| Surface | 3 | 8 |
|---|---|---|
| D | 4.831E-4 | −6.299E-4 |
| E | 1.833E-5 | −1.691E-6 |
| F | −8.488E-7 | −1.255E-6 |
| G | 3.646E-8 | 5.644E-8 |

TABLE 15

Zoom interval of fourth embodiment for 2-m object point

| | Wide-angle end | Standard position | Telephoto end |
|---|---|---|---|
| f | 3.001 | 7.471 | 8.657 |
| F/NO | 2.091 | 3.019 | 3.270 |

TABLE 15-continued

Zoom interval of fourth embodiment for 2-m object point

| | Wide-angle end | Standard position | Telephoto end |
|---|---|---|---|
| d6 | 13.070 | 2.657 | 1.699 |
| d14 | 1.000 | 5.166 | 6.276 |

TABLE 16

Value of conditional expression of fourth embodiment

| fW/|f1| | 0.40 | (r2 + r4)/2/|f1| | 0.79 |
|---|---|---|---|
| r5/|f1| | 0.94 | (vL1 + vL2)/2 − vL3 | 27.1 |
| r10/f2 | 0.82 | r12/f2 | 0.47 |

TABLE 17

Fifth embodiment

| Group | Surface | r | d | n | v |
|---|---|---|---|---|---|
| 1 | 1 | 12.636 | 1.00 | 1.67790 | 55.5 |
| | 2 | 5.779 | 2.24 | | |
| | 3 | 14.549 | 0.80 | 1.69680 | 55.6 |
| | 4 | 4.557 | 1.98 | | |
| | 5 | 5.791 | 2.00 | 1.75520 | 27.5 |
| | 6 | 7.453 | Variable | | |
| | 7 | | 1.00 | | |
| 2 | 8 | 5.508 | 2.10 | 1.56883 | 56.0 |
| | 9 | −33.958 | 0.10 | | |
| | 10 | 5.738 | 2.50 | 1.60311 | 60.7 |
| | 11 | −7.244 | 0.70 | 1.74000 | 28.2 |
| | 12 | 3.581 | 0.38 | | |
| | 13 | 8.806 | 1.40 | 1.68893 | 31.1 |
| | 14 | −24.167 | Variable | | |
| 3 | 15 | ∞ | 4.50 | 1.51633 | 64.1 |
| | 16 | ∞ | — | | |

TABLE 18

Aspheric surface factor of fifth embodiment

| Surface | 1 | 10 |
|---|---|---|
| D | 1.927E-4 | −8.338E-4 |
| E | 3.203E-6 | −4.188E-5 |
| F | −9.790E-8 | −2.641E-6 |
| G | 2.362E-9 | −1.390E-7 |

TABLE 19

Zoom interval of fifth embodiment for 2-m object point

| | Wide-angle end | Standard position | Telephoto end |
|---|---|---|---|
| f | 3.000 | 7.528 | 8.672 |
| F/NO | 2.041 | 2.916 | 3.141 |
| d6 | 13.070 | 2.607 | 1.694 |
| d14 | 1.000 | 5.158 | 6.211 |

TABLE 20

Value of conditional expression of fifth embodiment

| fW/|f1| | 0.40 | (r2 + r4)/2/|f1| | 0.68 |
|---|---|---|---|
| r5/|f1| | 0.77 | (vL1 + vL2)/2 − vL3 | 28.1 |
| r10/f2 | 0.83 | r12/f2 | 0.52 |

TABLE 21

Sixth embodiment

| Group | Surface | r | d | n | ν |
|---|---|---|---|---|---|
| 1 | 1 | 37.045 | 1.00 | 1.66547 | 55.2 |
|  | 2 | 5.700 | 1.42 |  |  |
|  | 3 | 15.012 | 0.80 | 1.77250 | 49.6 |
|  | 4 | 4.887 | 1.65 |  |  |
|  | 5 | 6.918 | 2.00 | 1.80518 | 25.5 |
|  | 6 | 12.616 | Variable |  |  |
|  | 7 |  | 1.00 |  |  |
| 2 | 8 | 6.330 | 2.50 | 1.60602 | 57.4 |
|  | 9 | −14.092 | 0.10 |  |  |
|  | 10 | 12.616 | 2.20 | 1.58913 | 61.2 |
|  | 11 | −12.616 | 0.60 | 1.75520 | 27.5 |
|  | 12 | 4.688 | 0.36 |  |  |
|  | 13 | 10.181 | 1.80 | 1.58144 | 40.8 |
|  | 14 | −10.181 | Variable |  |  |
| 3 | 15 | ∞ | 4.50 | 1.51633 | 64.1 |
|  | 16 | ∞ | — |  |  |

TABLE 22

Aspheric surface factor of sixth embodiment

| Surface | 1 | 8 | 9 |
|---|---|---|---|
| D | 3.895E-4 | −8.516E-4 | −3.907E-5 |
| E | 1.316E-6 | −7.125E-7 | −1.100E-6 |
| F | −5.517E-8 | −6.206E-6 | −6.200E-6 |
| G | 9.98E-10 | 1.937E-7 | 2.532E-7 |

TABLE 23

Zoom interval of sixth embodiment for 2-m object point

|  | Wide-angle end | Standard position | Telephoto end |
|---|---|---|---|
| f | 3.000 | 6.912 | 8.700 |
| F/NO | 2.067 | 2.789 | 3.170 |
| d6 | 13.301 | 3.091 | 1.482 |
| d14 | 1.000 | 5.031 | 7.056 |

TABLE 24

Value of conditional expression of sixth embodiment

| fW/|f1| | 0.43 | (r2 + r4)/2/|f1| | 0.76 |
|---|---|---|---|
| r5/|f1| | 1.00 | (νL1 + νL2)/2 − νL3 | 26.9 |
| r10/f2 | 1.62 | r12/f2 | 0.60 |

TABLE 25

Seventh embodiment

| Group | Surface | r | d | n | ν |
|---|---|---|---|---|---|
| 1 | 1 | 40.183 | 1.00 | 1.66547 | 55.2 |
|  | 2 | 5.700 | 1.47 |  |  |
|  | 3 | 16.306 | 0.80 | 1.77250 | 49.6 |
|  | 4 | 4.887 | 1.33 |  |  |
|  | 5 | 6.574 | 2.00 | 1.80518 | 25.5 |
|  | 6 | 12.616 | Variable |  |  |
|  | 7 |  | 1.00 |  |  |
| 2 | 8 | 6.152 | 2.40 | 1.60602 | 57.4 |
|  | 9 | −15.124 | 0.10 |  |  |
|  | 10 | 10.896 | 2.00 | 1.58913 | 61.2 |
|  | 11 | −10.896 | 0.80 | 1.68893 | 31.1 |
|  | 12 | 4.326 | 0.44 |  |  |
|  | 13 | 11.234 | 1.60 | 1.51823 | 59.0 |
|  | 14 | −11.234 | Variable |  |  |
| 3 | 15 | ∞ | 4.50 | 1.51633 | 64.1 |
|  | 16 | ∞ | — |  |  |

TABLE 26

Aspheric surface factor of seventh embodiment

| Surface | 1 | 8 | 9 |
|---|---|---|---|
| D | 3.618E-4 | −8.116E-4 | 4.008E-5 |
| E | 7.327E-7 | 6.994E-6 | 9.534E-6 |
| F | −5.614E-8 | −4.319E-6 | −4.695E-6 |
| G | 1.2394-9 | 7.020E-8 | 1.264E-7 |

TABLE 27

Zoom interval of seventh embodiment for 2-m object point

|  | Wide-angle end | Standard position | Telephoto end |
|---|---|---|---|
| f | 3.000 | 6.855 | 8.559 |
| F/NO | 2.079 | 2.836 | 3.178 |
| d6 | 14.195 | 4.104 | 2.540 |
| d14 | 1.000 | 5.009 | 6.962 |

TABLE 28

Value of conditional expression of seventh embodiment

| fW/|f1| | 0.44 | (r2 + r4)/2/|f1| | 0.77 |
|---|---|---|---|
| r5/|f1| | 0.96 | (νL1 + νL2)/2 − νL3 | 26.9 |
| r10/f2 | 1.39 | r12/f2 | 0.55 |

TABLE 29

Eighth embodiment

| Group | Surface | r | d | n | ν |
|---|---|---|---|---|---|
| 1 | 1 | 43.546 | 1.50 | 1.66793 | 55.3 |
|  | 2 | 5.559 | 1.51 |  |  |
|  | 3 | 15.138 | 0.80 | 1.77250 | 49.6 |
|  | 4 | 4.861 | 1.33 |  |  |
|  | 5 | 6.467 | 1.70 | 1.80518 | 25.5 |
|  | 6 | 12.339 | Variable |  |  |
|  | 7 |  | 1.00 |  |  |
| 2 | 8 | 6.337 | 2.40 | 1.60602 | 57.4 |
|  | 9 | −14.789 | 0.10 |  |  |
|  | 10 | 10.162 | 2.00 | 1.58913 | 61.2 |
|  | 11 | −10.162 | 0.82 | 1.68649 | 30.9 |
|  | 12 | 4.271 | 0.46 |  |  |
|  | 13 | 11.401 | 1.60 | 1.51823 | 59.0 |
|  | 14 | −11.401 | Variable |  |  |
| 3 | 15 | ∞ | 4.50 | 1.51633 | 64.1 |
|  | 16 | ∞ | — |  |  |

TABLE 30

Aspheric surface factor of eighth embodiment

| Surface | 1 | 8 | 9 |
|---|---|---|---|
| D | 3.633E-4 | −8.826E-4 | −1.189E-4 |
| E | −2.708E-6 | 2.301E-5 | 3.012E-5 |
| F | 1.001E-7 | −8.040E-6 | −9.532E-6 |
| G | −1.263E-9 | 2.076E-7 | 3.420E-7 |

TABLE 31

Zoom interval of eighth embodiment for 2-m object point

|  | Wide-angle end | Standard position | Telephoto end |
|---|---|---|---|
| f | 3.000 | 6.855 | 8.559 |
| F/NO | 2.083 | 2.844 | 3.190 |
| d6 | 14.195 | 4.104 | 2.540 |
| d14 | 1.600 | 6.009 | 7.962 |

TABLE 32

Value of conditional expression of eighth embodiment

| d1/fW | 0.50 | | |
|---|---|---|---|
| fW/|f1| | 0.44 | (r2 + r4)/2/|f1| | 0.76 |
| r5/|f1| | 0.94 | (vL1 + vL2)/2 − vL3 | 26.9 |
| r10/f2 | 1.30 | r12/f2 | 0.55 |

TABLE 33

Ninth embodiment

| Group | Surface | r | d | n | v |
|---|---|---|---|---|---|
| 1 | 1 | 39.250 | 1.20 | 1.66793 | 55.3 |
|   | 2 | 5.700 | 1.47 | | |
|   | 3 | 16.306 | 0.80 | 1.77250 | 49.6 |
|   | 4 | 4.887 | 1.33 | | |
|   | 5 | 6.574 | 1.70 | 1.80518 | 25.5 |
|   | 6 | 12.616 | Variable | | |
|   | 7 | | 1.00 | | |
| 2 | 8 | 6.152 | 2.40 | 1.60602 | 57.4 |
|   | 9 | −15.124 | 0.10 | | |
|   | 10 | 10.896 | 2.00 | 1.58913 | 61.2 |
|   | 11 | −10.896 | 0.82 | 1.68649 | 30.9 |
|   | 12 | 4.300 | 0.45 | | |
|   | 13 | 11.234 | 1.60 | 1.51823 | 59.0 |
|   | 14 | −11.234 | Variable | | |
| 3 | 15 | ∞ | 4.50 | 1.51633 | 64.1 |
|   | 16 | ∞ | — | | |

TABLE 34

Aspheric surface factor of ninth embodiment

| Surface | 1 | 8 | 9 |
|---|---|---|---|
| D | 3.888E-4 | −8.333E-4 | 8.804E-6 |
| E | −4.405E-6 | 3.249E-5 | 4.337E-5 |
| F | 1.680E-7 | −8.470E-6 | −1.022E-5 |
| G | −1.860E-9 | 2.786E-7 | 4.034E-7 |

TABLE 35

Zoom interval of ninth embodiment for 2-m object point

|  | Wide-angle end | Standard position | Telephoto end |
|---|---|---|---|
| f | 3.008 | 6.874 | 8.581 |
| F/NO | 2.079 | 2.834 | 3.176 |
| d6 | 14.195 | 4.102 | 2.539 |
| d14 | 1.600 | 6.028 | 8.016 |

TABLE 36

Value of conditional expression of ninth embodiment

| d1/fW | 0.40 | | |
|---|---|---|---|
| fW/|f1| | 0.44 | (r2 + r4)/2/|f1| | 0.77 |

TABLE 36-continued

Value of conditional expression of ninth embodiment

| r5/|f1| | 0.95 | (vL1 + vL2)/2 − vL3 | 26.9 |
|---|---|---|---|
| r10/f2 | 1.39 | r12/f2 | 0.55 |

TABLE 37

Tenth embodiment

| Group | Surface | r | d | n | v |
|---|---|---|---|---|---|
| 1 | 1 | 73.839 | 2.00 | 1.66793 | 55.3 |
|   | 2 | 5.942 | 1.17 | | |
|   | 3 | 12.779 | 0.80 | 1.77250 | 49.6 |
|   | 4 | 4.737 | 1.64 | | |
|   | 5 | 6.594 | 1.70 | 1.80518 | 25.5 |
|   | 6 | 11.293 | Variable | | |
|   | 7 | | 1.00 | | |
| 2 | 8 | 6.434 | 2.40 | 1.60602 | 57.4 |
|   | 9 | −13.616 | 0.10 | | |
|   | 10 | 10.374 | 2.00 | 1.58913 | 61.2 |
|   | 11 | −10.374 | 0.82 | 1.68649 | 30.9 |
|   | 12 | 4.294 | 0.46 | | |
|   | 13 | 11.783 | 1.60 | 1.51823 | 59.0 |
|   | 14 | −11.783 | Variable | | |
| 3 | 15 | ∞ | 4.50 | 1.51633 | 64.1 |
|   | 16 | ∞ | — | | |

TABLE 38

Aspheric surface factor of tenth embodiment

| Surface | 1 | 8 | 9 |
|---|---|---|---|
| D | 3.587E-4 | −9.560E-4 | −1.744E-4 |
| E | −4.139E-6 | 1.731E-5 | 2.388E-5 |
| F | 1.630E-7 | −7.426E-6 | −8.925E-6 |
| G | −2.370E-9 | 1.227E-7 | 2.705E-7 |

TABLE 39

Zoom interval of tenth embodiment for 2-m object point

|  | Wide-angle end | Standard position | Telephoto end |
|---|---|---|---|
| f | 3.000 | 6.855 | 8.559 |
| F/NO | 2.088 | 2.854 | 3.203 |
| d6 | 14.195 | 4.104 | 2.540 |
| d14 | 1.600 | 6.009 | 7.962 |

TABLE 40

Value of conditional expression of tenth embodiment

| d1/fW | 0.67 | | |
|---|---|---|---|
| fW/|f1| | 0.44 | (r2 + r4)/2/|f1| | 0.78 |
| r5/|f1| | 0.96 | (vL1 + vL2)/2 − vL3 | 26.9 |
| r10/f2 | 1.32 | r12/f2 | 0.55 |

TABLE 41

Eleventh embodiment

| Group | Surface | r | d | n | v |
|---|---|---|---|---|---|
| 1 | 1 | 15.775 | 1.00 | 1.67790 | 55.5 |
|   | 2 | 5.377 | 1.68 | | |
|   | 3 | 13.621 | 1.00 | 1.77250 | 49.6 |
|   | 4 | 4.729 | 1.85 | | |
|   | 5 | 6.822 | 2.00 | 1.80518 | 25.5 |

TABLE 41-continued

Eleventh embodiment

| Group | Surface | r | d | n | v |
|---|---|---|---|---|---|
| | 6 | 11.155 | Variable | | |
| | 7 | | 1.00 | | |
| 2 | 8 | 6.335 | 2.20 | 1.60311 | 60.7 |
| | 9 | −16.317 | 0.10 | | |
| | 10 | 5.791 | 2.40 | 1.58913 | 61.2 |
| | 11 | −13.253 | 0.70 | 1.74000 | 28.2 |
| | 12 | 3.308 | 0.41 | | |
| | 13 | 7.774 | 1.40 | 1.60342 | 38.0 |
| | 14 | −40.735 | Variable | | |
| 3 | 15 | ∞ | 4.50 | 1.51633 | 64.1 |
| | 16 | ∞ | — | | |

TABLE 42

Aspheric surface factor of eleventh embodiment

| Surface | 3 | 8 |
|---|---|---|
| D | 4.148E-4 | −6.404E-4 |
| E | 3.267E-5 | 4.942E-6 |
| F | −1.663E-6 | −2.560E-6 |
| G | 5.433E-8 | 1.326E-7 |

TABLE 43

Zoom interval of eleventh embodiment for 2-m object point

| | Wide-angle end | Standard position | Telephoto end |
|---|---|---|---|
| f | 3.000 | 7.471 | 8.658 |
| F/NO | 2.098 | 3.039 | 3.294 |
| d6 | 13.070 | 2.657 | 1.699 |
| d14 | 1.000 | 5.166 | 6.276 |

TABLE 44

Value of conditional expression of eleventh embodiment

| d3/fW | 0.33 | | |
|---|---|---|---|
| |f1|/fW | 0.40 | (r2 + r4)/2/|f1| | 0.67 |
| r5/|f1| | 0.91 | (vL1 + vL2)/2 − vL3 | 27.1 |
| r10/f2 | 0.83 | r12/f2 | 0.48 |

TABLE 45

12th embodiment

| Group | Surface | r | d | n | v |
|---|---|---|---|---|---|
| 1 | 1 | 19.655 | 1.00 | 1.67790 | 55.5 |
| | 2 | 5.618 | 1.22 | | |
| | 3 | 11.188 | 1.50 | 1.77250 | 49.6 |
| | 4 | 4.677 | 2.19 | | |
| | 5 | 6.807 | 2.00 | 1.80518 | 25.5 |
| | 6 | 9.987 | Variable | | |
| | 7 | | 1.00 | | |
| 2 | 8 | 6.353 | 2.20 | 1.60311 | 60.7 |
| | 9 | −15.875 | 0.10 | | |
| | 10 | 5.869 | 2.40 | 1.58913 | 61.2 |
| | 11 | −14.810 | 0.70 | 1.74000 | 28.2 |
| | 12 | 3.040 | 0.41 | | |
| | 13 | 8.000 | 1.40 | 1.60342 | 38.0 |
| | 14 | −41.147 | Variable | | |
| 3 | 15 | ∞ | 4.50 | 1.51633 | 64.1 |
| | 16 | ∞ | — | | |

TABLE 46

Aspheric surface factor of 12th embodiment

| Surface | 3 | 8 |
|---|---|---|
| D | 3.898E-4 | −6.662E-4 |
| E | 2.831E-5 | 5.591E-6 |
| F | −1.301E-6 | −2.716E-6 |
| G | 4.225E-8 | 1.434E-7 |

TABLE 47

Zoom interval of 12th embodiment for 2-m object point

| | Wide-angle end | Standard position | Telephoto end |
|---|---|---|---|
| f | 3.001 | 7.474 | 8.661 |
| F/NO | 2.098 | 3.038 | 3.292 |
| d6 | 13.070 | 2.657 | 1.699 |
| d14 | 1.000 | 5.166 | 6.276 |

TABLE 48

Value of conditional expression of 12th embodiment

| d3/fW | 0.50 | | |
|---|---|---|---|
| |f1|/fW | 0.40 | (r2 + r4)/2/|f1| | 0.69 |
| r5/|f1| | 0.91 | (vL1 + vL2)/2 − vL3 | 27.1 |
| r10/f2 | 0.84 | r12/f2 | 0.48 |

What is claimed is:

1. A wide-angle aspheric zoom lens comprising:

a first lens group having a negative refracting power and a second lens group having a positive refracting power which are arranged in order from an object side, wherein zooming is performed by changing an aerial interval between the first lens group and second lens group, and wherein each of the first lens group and the second lens group has one or more aspheric surfaces;

wherein the first lens group includes two meniscus negative lenses L1 and L2, each of which has an image side which is concave, and a first positive lens L3 whose object side is convex, wherein the two miniscus lenses L1 and L2 and the first positive lens L3 are arranged in order from the object side, and wherein the first lens group has one or more aspheric surfaces; and the second lens group includes a second positive lens, a cemented lens having a third positive lens and a first negative lens, and a fourth position lens, which are arranged in order from the object side.

2. The wide-angle aspheric zoom lens according to claim 1, wherein the second positive lens includes a lens L4 whose object side and image side are convex, wherein the third positive lens includes a lens L5 whose object side is convex, wherein the first negative lens includes a lens L6 whose image side is concave, and wherein the fourth positive lens includes a lens L7 whose object side is convex.

3. A wide-angle aspheric zoom lens comprising:

a first lens group having a negative refracting power, wherein the first lens group includes a first negative lens, a second negative lens, and a first positive lens arranged in order from an object side; and a second lens group having a positive refracting power, wherein the second lens group includes a second positive lens, a cemented lens having a third positive lens and a third negative lens, and a fourth positive lens arranged in order from the object side, wherein the first lens group and the second lens group are arranged in order from the object side, wherein zooming is performed by changing an aerial interval between the first lens group and the second lens group, and wherein each of the first lens group and the second lens group have one or more aspheric surfaces;

wherein the second positive lens includes a lens L4 whose object side and image side are convex, wherein the third positive lens includes a lens L5 whose object side is convex, wherein the third negative lens includes a lens L6 whose image side is concave, and wherein the fourth positive lens includes a lens L7 whose object side is convex, wherein the lens L5, which is the second lens of the second lens group from the object side, is a positive lens whose object side and image side have the same radius of curvature.

4. A wide-angle aspheric zoom lens comprising:

a first lens group having a negative refracting power, wherein the first lens group includes a first negative lens, a second negative lens, and a first positive lens arranged in order from an object side; and a second lens group having a positive refracting power, wherein the second lens group includes a second positive lens, a cemented lens having a third positive lens and a third negative lens, and a fourth positive lens arranged in order from the object side, wherein the first lens group and the second lens group are arranged in order from the object side, wherein zooming is performed by changing an aerial interval between the first lens group and the second lens group, and wherein each of the first lens group and the second lens group have one or more aspheric surfaces;

wherein the second positive lens includes a lens L4 whose object side and image side are convex, wherein the third positive lens includes lens L5 whose object side is convex, wherein the third negative lens includes a lens L6 whose image side is concave, and wherein the fourth positive lens includes a lens L7 whose object side is convex, wherein the lens L7, which is the fourth lens of the second lens group from the object side, is a positive lens whose object side and image side have the same radius of curvature.

5. A wide-angle aspheric zoom lens comprising:

a first lens group having a negative refracting power, wherein the first lens group includes a first negative lens, a second negative lens, and a first positive lens arranged in order from an object side; and a second lens group having a positive refracting power, wherein the second lens group includes a second positive lens, a cemented lens having a third positive lens and a third negative lens, and a fourth positive lens arranged in order from the object side, wherein the first lens group and the second lens group are arranged in order from the object side, wherein zooming is performed by changing an aerial interval between the first lens group and the second lens group, and wherein each of the first lens group and the second lens group have one or more aspheric surfaces;

wherein the second positive lens includes a lens L4 whose object side and image side are convex, wherein the third positive lens includes a lens L5 whose object side is convex, wherein the third negative lens includes a lens L6 whose image side is concave, and wherein the fourth positive lens includes a lens L7 whose object side is convex, wherein the second lens group meets the following conditions:

(1) $0.6 < r10/f2 < 3.0$; and (2) $0.4 < r12/f2 < 0.8$, wherein, in the above expressions, f2 represents a focal length of the second lens group, and r10 and r12 represent radiuses of curvature of the object side of lens L5 and the image side of lens L6, respectively.

6. A wide-angle aspheric zoom lens comprising:

a first lens group having a negative refracting power, wherein the first lens group includes a first negative lens, a second negative lens, and a first positive lens arranged in order from an object side; and a second lens group having a positive refracting power, wherein the second lens group includes a second positive lens, a cemented lens having a third positive lens and a third negative lens, and a fourth positive lens arranged in order from the object side, wherein the first lens group and the second lens group are arranged in order from the object side, wherein zooming is performed by changing an aerial interval between the first lens group and second lens group, and wherein each of the first lens group and the second lens group have one or more aspheric surfaces, wherein the first negative lens includes a lens L1 which is the first lens of the first lens group from the object side, wherein the first negative lens has one or more aspheric surfaces and meets the following condition:

(1) $d1/fW > 0.35$, wherein, in the above expression, d1 represents a center thickness of the first negative lens, and fW represents a focal length at a wide-angle end.

7. A wide-angle aspheric zoom lens comprising:

a first lens group having a negative refracting power, wherein the first lens group includes a first negative lens, a second negative lens, and a first positive lens arranged in order from an object side; and a second lens group having a positive refracting power, wherein the second lens group includes a second positive lens, a cemented lens having a third positive lens and a third negative lens, and a fourth positive lens arranged in order from the object side, wherein the first lens group and the second lens group are arranged in order from the object side, wherein zooming is performed by changing an aerial interval between the first lens group and second lens group, and wherein each of the first lens group and the second lens group have one or more aspheric surfaces, wherein the second negative lens includes a lens L2 which is the second lens of the first lens group from the object side, wherein the second negative lens has one or more aspheric surfaces and meets the following condition:

(1) $d3/fW > 0.3$, wherein, in the above expression, d3 represents a center thickness of the second negative lens, and fW represents a focal length at a wide-angle end.

8. A video camera using the wide-angle aspheric zoom lens according to the claim 2.

9. The wide-angle aspheric zoom lens according to claim 1, wherein the first lens group meets the following conditions:

(1) $0.3 < fW/|f1| < 0.5$;

(2) $0.6 < \{(r2+r4)/|f1|\}/2 < 1.0$;

(3) $0.7 < r5/|f1| < 1.5$; and (4) $20 < (\nu L1+\nu L2)/2 - \nu L3$, wherein, in the above expressions, fW represents a focal length at a wide angle end; f1 represents a focal length of the first lens group; r2, r4, and r5 represent radiuses of curvature of an image-side surface of lens L1, an image-side surface of lens L2, and an object-side surface of lens L3, respectively; and νL1, νL2, and νL3 represent Abbe numbers of lenses L1, L2, and L3, respectively.

10. A video camera using the wide-angle aspheric zoom lens according to the claim 9.

11. A video camera using the wide-angle aspheric zoom lens according to the claim 2.

12. A video camera using the wide-angle aspheric zoom lens according to the claim 3.

13. A video camera using the wide-angle aspheric zoom lens according to the claim 4.

14. A video camera using the wide-angle aspheric zoom lens according to the claim 5.

15. A video camera using the wide-angle aspheric zoom lens according to the claim 6.

16. A video camera using the wide-angle aspheric zoom lens according to the claim 7.

* * * * *